United States Patent
Niwa

(10) Patent No.: US 11,523,079 B2
(45) Date of Patent: Dec. 6, 2022

(54) SOLID-STATE IMAGING ELEMENT AND IMAGING DEVICE

(71) Applicant: Sony Semiconductor Solutions Corporation, Kanagawa (JP)

(72) Inventor: Atsumi Niwa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/287,823

(22) PCT Filed: Oct. 15, 2019

(86) PCT No.: PCT/JP2019/040380
§ 371 (c)(1),
(2) Date: Apr. 22, 2021

(87) PCT Pub. No.: WO2020/105314
PCT Pub. Date: May 28, 2020

(65) Prior Publication Data
US 2021/0385404 A1  Dec. 9, 2021

(30) Foreign Application Priority Data

Nov. 19, 2018  (JP) .............................. JP2018-216589

(51) Int. Cl.
*H04N 5/374* (2011.01)
*H04N 5/355* (2011.01)
(Continued)

(52) U.S. Cl.
CPC ....... *H04N 5/37455* (2013.01); *H04N 5/3559* (2013.01); *H04N 5/37457* (2013.01)

(58) Field of Classification Search
CPC .. H04N 5/3745; H04N 5/37455; H04N 5/335; H04N 5/378; H04N 5/355;
(Continued)

(56) References Cited

U.S. PATENT DOCUMENTS

2016/0093273 A1\* 3/2016 Wang ..................... G09G 5/391
2016/0118424 A1   4/2016 Guidash et al.
(Continued)

FOREIGN PATENT DOCUMENTS

JP  2008-153828 A  7/2008
JP  2016-526817 A  9/2016
(Continued)

OTHER PUBLICATIONS

International Search Report (PCT/ISA/210), International Application No. PCT/JP2019/040380, dated Oct. 15, 2019.

*Primary Examiner* — Marly S Camargo
(74) *Attorney, Agent, or Firm* — Michael Best & Friedrich LLP

(57) ABSTRACT

To shorten time required for AD conversion when a solid-state imaging element that detects presence or absence of an address event further captures image data.
In a detection block, a first pixel that generates a first analog signal by photoelectric conversion and a second pixel that generates a second analog signal by photoelectric conversion are arrayed. A first analog-digital converter converts the first analog signal into a digital signal on the basis of whether or not a change amount of an incident light amount of the detection block exceeds a predetermined threshold. A second analog-digital converter converts the second analog signal into a digital signal on the basis of whether or not the change amount exceeds the threshold.

8 Claims, 25 Drawing Sheets

(51) Int. Cl.
*H01L 27/146* (2006.01)
*H01L 27/115* (2017.01)
*H03M 1/00* (2006.01)
*H04N 5/3745* (2011.01)

(58) Field of Classification Search
CPC . H04N 5/3559; H01L 27/146; H01L 27/1156; H03M 1/00; H03M 1/001; H03M 1/004
USPC .... 348/302, 301, 300, 308, 294, 297, 229.1; 257/291, 292, 293, 443; 250/208.1; 341/135, 110, 126, 155; 327/53, 66
See application file for complete search history.

(56) References Cited

U.S. PATENT DOCUMENTS

| | | | |
|---|---|---|---|
| 2016/0249002 A1* | 8/2016 | Kim | H04N 5/3745 |
| 2018/0167575 A1 | 6/2018 | Watanabe et al. | |
| 2020/0128205 A1* | 4/2020 | Sakakibara | H04N 5/37457 |
| 2020/0358977 A1* | 11/2020 | Niwa | H04N 5/37455 |
| 2021/0409637 A1* | 12/2021 | Sakakibara | H04N 5/37457 |
| 2022/0021837 A1* | 1/2022 | Zhu | H04N 5/37455 |
| 2022/0077207 A1* | 3/2022 | Ejiri | H01L 27/14612 |
| 2022/0141406 A1* | 5/2022 | Mabuchi | H04N 5/361 |
| 2022/0141411 A1* | 5/2022 | Sato | H04N 5/378 |

FOREIGN PATENT DOCUMENTS

| | | | | |
|---|---|---|---|---|
| JP | 2017-535999 A | 11/2017 | | |
| JP | WO2018198691 A1 * | 1/2018 | ............. | H03M 1/56 |
| WO | 2017/013806 A1 | 1/2017 | | |
| WO | 2018/198691 A1 | 11/2018 | | |

* cited by examiner

SOLID-STATE IMAGING ELEMENT AND IMAGING DEVICE

TECHNICAL FIELD

The present technology relates to a solid-state imaging element and an imaging device. More specifically, the present technology relates to a solid-state imaging element that compares a change amount of an incident light amount with a threshold, and an imaging device.

BACKGROUND ART

Conventionally, a synchronous solid-state imaging element for capturing image data (frame) in synchronization with a synchronous signal such as a vertical synchronous signal has been used in an imaging device or the like. The typical synchronous solid-state imaging element can acquire the image data only at each cycle (for example, 1/60 seconds) of the synchronous signal, and is thus difficult to deal with a case where higher-speed processing is required in the fields of transportation, robots, and the like. Therefore, an asynchronous solid-state imaging element that detects the presence or absence of an address event for each pixel has been proposed (for example, see Patent Document 1). Here, the address event means that a light amount of a pixel has varied at a certain pixel address and a variation amount has exceeded a threshold. The address event includes an on-event in which the light amount of a pixel has varied and the variation amount has exceeded a predetermined upper limit, and an off-event in which the variation amount has fallen below a predetermined lower limit. In the asynchronous solid-state imaging element, two-bit data including a detection result of a one-bit on-event and a detection result of a one-bit off-event is generated for each pixel. Such a solid-state imaging element for detecting the presence or absence of an address event for each pixel is called dynamic vision sensor (DVS).

CITATION LIST

Patent Document

Patent Document 1: PCT Japanese Translation Patent Publication No. 2017-535999

SUMMARY OF THE INVENTION

Problems to be Solved by the Invention

The above-described asynchronous solid-state imaging element (DVS) generates data at a much higher speed than the synchronous solid-state imaging element. However, in image recognition or the like, high-quality image data of three bits or more is sometimes required for each pixel, in addition to detection of the presence or absence of an address event, and the above-described DVS for generating two-bit data for each pixel cannot satisfy the request. To capture higher-quality image data, an analog to digital converter (ADC) that converts an analog signal generated by photoelectric conversion into three or higher-bit data is only required to be added to the DVS. However, this configuration has a problem that the AD conversion time is longer than the case of generating two-bit data for each pixel.

The present technology has been made in view of such a situation, and an object is to shorten the time required for AD conversion when further capturing image data in a solid-state imaging element that detects the presence or absence of an address event.

Solutions to Problems

The present technology has been made to solve the above-described problem and the first aspect is a solid-state imaging element including a detection block in which a first pixel that generates a first analog signal by photoelectric conversion and a second pixel that generates a second analog signal by photoelectric conversion are arrayed, a first analog-digital converter configured to convert the first analog signal into a digital signal on the basis of whether or not a change amount of an incident light amount of the detection block exceeds a predetermined threshold, and a second analog-digital converter configured to convert the second analog signal into a digital signal on the basis of whether or not the change amount exceeds the threshold. This brings about an effect that the first and second analog signals are converted into the digital signals in parallel.

Furthermore, in the first aspect, a first shared block in which a predetermined number of the first pixels is arrayed, the first pixels sharing a floating diffusion layer that accumulates a charge of an amount according to the first analog signal, and a second shared block in which a predetermined number of the second pixels is arrayed, the second pixels sharing a floating diffusion layer that accumulates a charge of an amount according to the second analog signal, may be further included, and at least a part of the first shared block and at least a part of the second shared block may be arranged in the detection block. This brings about an effect that pixel signals in an overlapping area of the detection block and the first and second shared blocks are read in parallel.

Furthermore, in the first aspect, the detection block may include first and second detection blocks, a part of the first shared block and a part of the second shared block may be arranged in the first detection block, and a rest of the first shared block and a rest of the second shared block may be arranged in the second detection block. This brings about an effect that pixel signals in an overlapping area of the detection block and the first and second shared blocks are read in parallel.

Furthermore, in the first aspect, a part of the first shared block and a part of the second shared block may be arranged in the detection block, and a rest of the first shared block and a rest of the second shared block may not be arranged in the detection block. This brings about an effect that an address event is detected in a part of the shared blocks, and an address event is not detected in the rest of the shared blocks.

Furthermore, in the first aspect, a drive circuit configured to change a size of the detection block by a predetermined control signal may be further included. This brings about an effect that the size of the detection block is changed.

Furthermore, in the first aspect, the detection block may include a plurality of first light-receiving units each configured to generate a charge by photoelectric conversion, a plurality of second light-receiving units each configured to generate a charge by photoelectric conversion, a first detection unit configured to detect whether or not a change amount of a photocurrent flowing through a first connection node to which the plurality of first light-receiving units is connected exceeds the threshold, a second detection unit configured to detect whether or not a change amount of a photocurrent flowing through a second connection node to which the plurality of second light-receiving units is connected exceeds the threshold, and a switch configured to open or close a path between the first connection node and the second connection node according to the control signal. This brings about an effect that the size of the detection block is changed by the control of the switch.

Furthermore, in the first aspect, the detection block may include a plurality of light-receiving units each configured to generate a charge by photoelectric conversion, and a detection unit configured to detect whether or not a change amount of a photocurrent according to an amount of the charge exceeds the threshold, the plurality of light-receiving units may be arranged in pixels different from one another, and the plurality of light-receiving units may share the detection unit. This brings about an effect that an address event is detected by the detection unit shared by the plurality of pixels.

Furthermore, the second aspect of the present technology is an imaging device including a detection block in which a first pixel that generates a first analog signal by photoelectric conversion and a second pixel that generates a second analog signal by photoelectric conversion are arrayed, a first analog-digital converter configured to convert the first analog signal into a digital signal on the basis of whether or not a change amount of an incident light amount of the detection block exceeds a predetermined threshold, a second analog-digital converter configured to convert the second analog signal into a digital signal on the basis of whether or not the change amount exceeds the threshold, and a signal processing unit configured to process the digital signals. This brings about an effect that the first and second analog signals are converted into the digital signals in parallel, and the digital signals are processed.

MODE FOR CARRYING OUT THE INVENTION

Hereinafter, modes for implementing the present technology (hereinafter referred to as embodiments) will be described. Description will be given according to the following order.

1. First Embodiment (an example of reading a plurality of pixel signals in parallel)
2. Second Embodiment (an example of reading a plurality of pixel signals in some of which no address event is detected in parallel)
3. Third Embodiment (an example of controlling a detection unit and reading a plurality of pixel signals in parallel)
4. Fourth Embodiment (scan method)
5. Applications to Moving Bodies

1. First Embodiment

[Configuration Example of Imaging Device]

Figure 1:
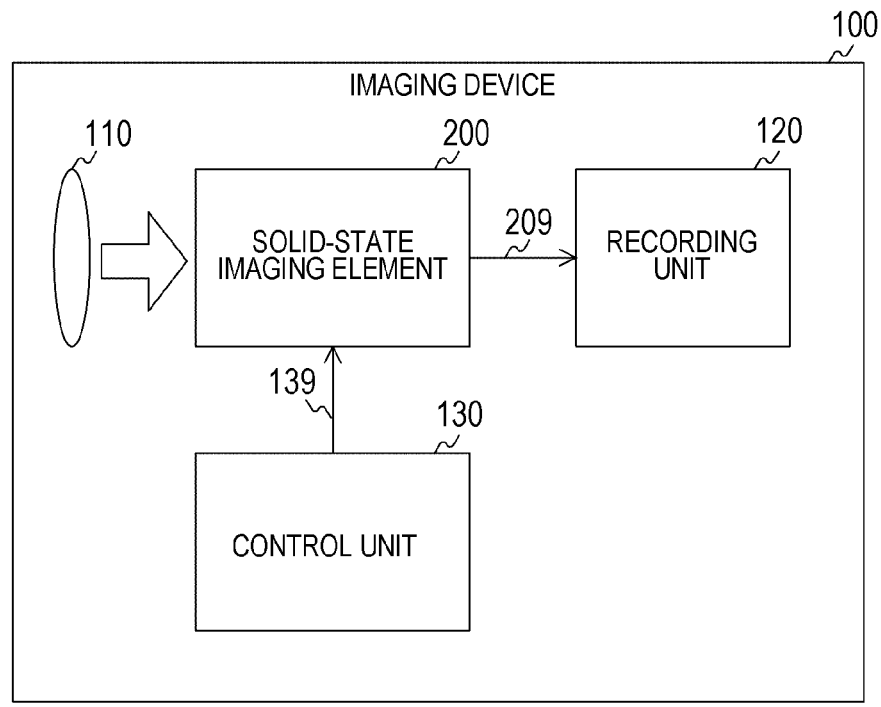
FIG. 1 is a block diagram illustrating a configuration example of an imaging device according to a first embodiment of the present technology.

FIG. 1 is a block diagram illustrating a configuration example of an imaging device 100 according to a first embodiment of the present technology. The imaging device 100 includes an imaging lens 110, a solid-state imaging element 200, a recording unit 120, and a control unit 130. As the imaging device 100, a camera mounted on an industrial robot, an in-vehicle camera, or the like is assumed.

The imaging lens 110 condenses incident light and guides the incident light to the solid-state imaging element 200. The solid-state imaging element 200 photoelectrically converts the incident light while detecting presence or absence of an address event to capture image data. The solid-state imaging element 200 executes predetermined signal processing such as image recognition processing for the captured image data, and outputs data indicating a processing result to the recording unit 120 via a signal line 209.

The recording unit 120 records the data from the solid-state imaging element 200. The control unit 130 controls the solid-state imaging element 200 to capture image data.

[Configuration Example of Solid-State Imaging Element]

Figure 2:
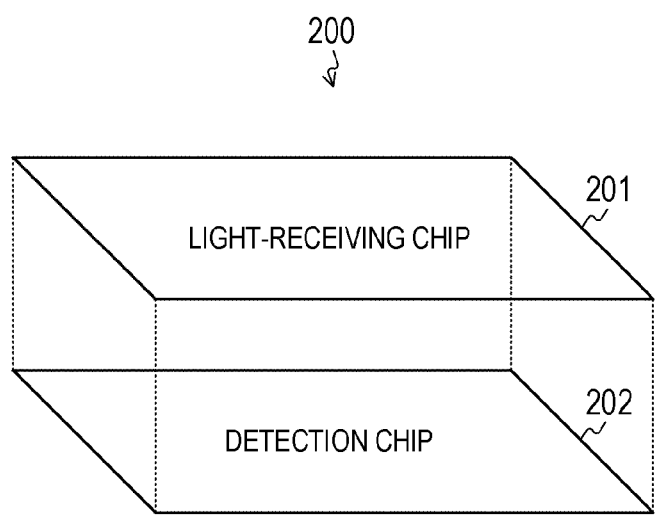
FIG. 2 is a diagram illustrating an example of a stacked structure of a solid-state imaging element according to the first embodiment of the present technology.

FIG. 2 is a diagram illustrating an example of a stacked structure of the solid-state imaging element 200 according to the first embodiment of the present technology. The solid-state imaging element 200 includes a detection chip 202 and a light-receiving chip 201 stacked on the detection chip 202. These chips are electrically connected via a connection part such as a via. Note that Cu—Cu bonding or bump can be used for connection in addition to the via.

Figure 3:
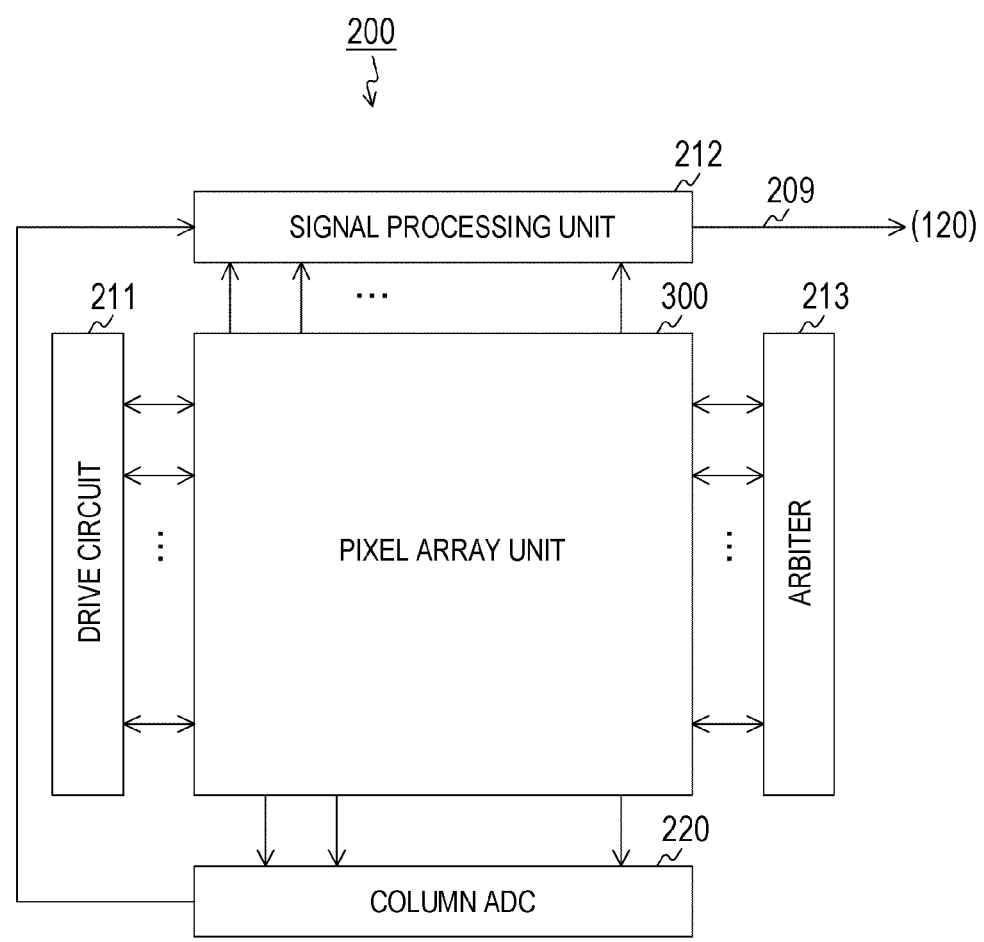
FIG. 3 is a block diagram illustrating a configuration example of the solid-state imaging element according to the first embodiment of the present technology.

FIG. 3 is a block diagram illustrating a configuration example of the solid-state imaging element 200 according to the first embodiment of the present technology. The solid-state imaging element 200 includes a drive circuit 211, a signal processing unit 212, an arbiter 213, a column ADC 220, and a pixel array unit 300.

In the pixel array unit 300, a plurality of pixels 310 is arrayed in a two-dimensional lattice manner. Hereinafter, a set of the pixels arrayed in a horizontal direction is referred to as a "row", and a set of the pixels arrayed in a direction perpendicular to the row is referred to as a "column".

The pixel in the pixel array unit generates an analog signal as a pixel signal by photoelectric conversion. Furthermore, the pixel detects the presence or absence of an address event according to whether or not a change amount of an incident light amount has exceeded a predetermined threshold. Then, when an address event has occurred, the pixel outputs a request to the arbiter 213. Then, when receiving a response to the request, the pixel transmits a detection signal indicating a detection result of the address event to the drive circuit 211 and the signal processing unit 212.

The drive circuit 211 drives each pixel 310 to output the pixel signal to the column ADC 220.

The arbiter 213 arbitrates requests from the pixels and returns a response on the basis of an arbitration result.

The column ADC 220 converts the analog pixel signal from the pixel array unit 300 into a digital signal. The column ADC 220 supplies the digital signal to the signal processing unit 212.

The signal processing unit 212 executes predetermined signal processing such as correlated double sampling (CDS) processing and image recognition processing for the digital signal from the column ADC 220 and the detection signal from the pixel. The signal processing unit 212 supplies data indicating a processing result to the recording unit 120 via the signal line 209.

[Configuration Example of Pixel Array Unit]

Figure 4:
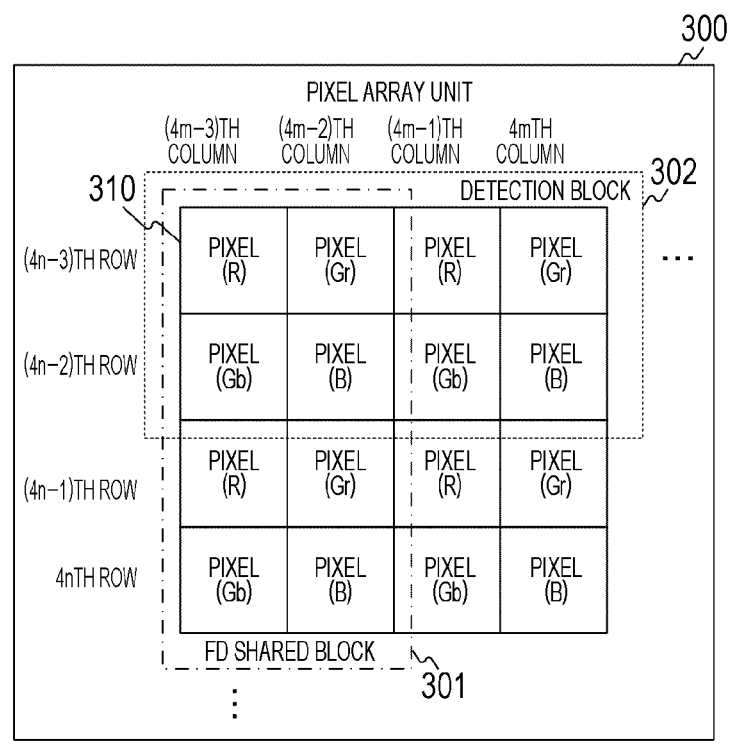
FIG. 4 is a plan view illustrating a configuration example of a pixel array unit according to the first embodiment of the present technology.

FIG. 4 is a plan view illustrating a configuration example of the pixel array unit 300 according to the first embodiment of the present technology. In the pixel array unit 300, the plurality of pixels 310 is arrayed in a two-dimensional lattice manner. For example, a red (R) pixel, a green (G) pixel, and a blue (B) pixel are arrayed as the pixels 310 by a Bayer array. Note that the array of the pixels 310 is not limited to the Bayer array. For example, an R pixel, a G pixel, a B pixel and a white (W) pixel can be arrayed.

Furthermore, the pixel array unit 300 is divided by a plurality of FD shared blocks 301 in each which a predetermined number of pixels 310 that shares a floating diffusion layer (FD) is arrayed. For example, the pixels 310 in four rows×two columns share an FD, and an area including the pixels 310 is arranged as the FD shared block 301.

Moreover, the pixel array unit 300 is divided by a plurality of detection blocks 302 in each which a predetermined number of pixels 310 is arrayed. Here, the detection block 302 is an area of the smallest unit for detecting the presence or absence of an address event, and the pixels 310 in this area share a circuit for detecting the address event.

Furthermore, the detection block 302 has a different shape from the FD shared block 301, and the detection block 302 is divided into a plurality of blocks by the plurality of FD shared blocks 301. For example, the detection block 302 includes the pixels 310 in two rows×four columns, and is divided into two blocks by the FD shared block 301 having four rows×two columns.

The number of rows is 4N (N is an integer) and the number of columns is 4M (M is an integer). Furthermore, n is an integer of 1 to N and m is an integer of 1 to M, and attention is given to sixteen pixels in four rows×four columns. These sixteen pixels are divided by two FD shared blocks 301 and two detection blocks 302. One of the two FD shared blocks 301 is a left-side block, the other is a right-side block, one of the two detection blocks 302 is an upper-side block, and the other is a lower-side block.

The left-side FD shared block 301 includes eight pixels in four rows×two columns. Those pixels are arranged in coordinates (4n−3, 4m−3), (4n−2, 4m−3), (4n−1, 4m−3), (4n, 4m−3), (4n−3, 4m−2), (4n−2, 4m−2), (4n−1, 4m−2), and (4n, 4m−2). The right-side FD shared block 301 also includes eight pixels in four rows×two columns. Those pixels are arranged in coordinates (4n−3, 4m−1), (4n−2, 4m−1), (4n−1, 4m−1), (4n, 4m−1), (4n−3, 4m), (4n−2, 4m), (4n−1, 4m), and (4n, 4m).

Meanwhile, the upper-side detection block 302 includes eight pixels in two rows×four columns. Those pixels are arranged in coordinates (4n−3, 4m−3), (4n−3, 4m−2), (4n−3, 4m−1), (4n−3, 4m), (4n−2, 4m−3), (4n−2, 4m−2), (4n−2, 4m−1), and (4n−2, 4m). The lower-side detection block 302 also includes eight pixels in two rows×four columns. Those pixels are arranged in coordinates (4n−1, 4m−3), (4n−1, 4m−2), (4n−1, 4m−1), (4n−1, 4m), (4n, 4m−3), (4n, 4m−2), (4n, 4m−1), and (4n, 4m).

Furthermore, the FD shared block 301 and the detection block 302 partially overlap. In FIG. 4, a part of the left-side FD shared block 301 is arranged in the upper-side detection block 302, and the other of the left-side FD shared block 301 is arranged in the lower-side detection block 302. The same similarly applies to the right-side FD shared block 301.

Note that the detection block 302 has the two rows×four columns, and the FD shared block 301 has the four rows× two columns. However, the configuration is not limited as long as the detection block 302 is divided by a plurality of the FD shared blocks 301. Other examples of the shapes of the detection block 302 and the FD shared block 301 will be described below.

Note that the left-side FD shared block 301 is an example of a first shared block described in the claims, and the right-side FD shared block 301 is an example of a second shared block described in the claims. Furthermore, the upper-side detection block 302 is an example of a first detection block described in the claims, and the lower-side detection block 302 is an example of a second detection block described in the claims.

Figure 5:
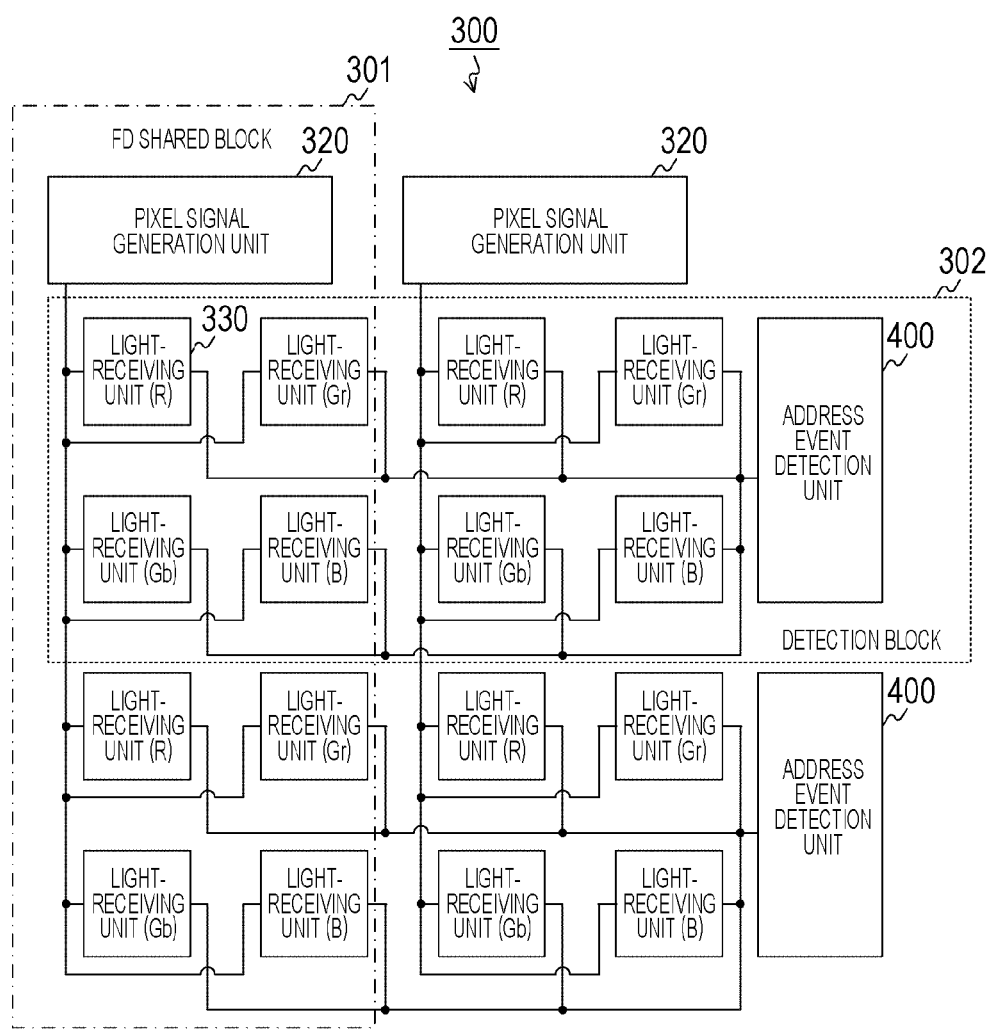
FIG. 5 is a block diagram illustrating a configuration example of the pixel array unit according to the first embodiment of the present technology.

FIG. 5 is a block diagram illustrating a configuration example of the pixel array unit 300 according to the first embodiment of the present technology. In the pixel array unit 300, a light-receiving unit 330 is arranged for each pixel, a pixel signal generation unit 320 is arranged for each FD shared block 301, and an address event detection unit 400 is arranged for each detection block 302.

Assuming that the number of pixels is 4N×4M, the number of light-receiving units 330 is also 4N×4M. Furthermore, assuming that the number of pixels of each of the FD shared block 301 and the detection block 302 is eight, (4N×4M)/8 FD shared blocks 301 and detection blocks 302 are arranged. (4N×4M)/8 pixel signal generation units 320 and address event detection units 400 are similarly arranged.

The light-receiving unit 330 includes two connection nodes, one of which is connected to the address event detection unit 400 and the other of which is connected to the pixel signal generation unit 320. Furthermore, the light-receiving units 330 in four rows×two columns are commonly connected to one pixel signal generation unit 320, and the light-receiving units 330 in two rows×four columns are commonly connected to one address event detection unit 400. The light-receiving units 330 in four rows×two columns and the pixel signal generation unit 320 connected thereto form the FD shared block 301. Meanwhile, the light-receiving units 330 in two rows×four columns and the address event detection unit 400 connected thereto form the detection block 302.

The light-receiving unit 330 photoelectrically converts the incident light to generate a charge. The light-receiving unit 330 transfers the charge to either the pixel signal generation unit 320 or the address event detection unit 400 according to the control of the drive circuit 211.

The pixel signal generation unit 320 generates an analog signal according to a photocurrent as a pixel signal SIG. The pixel signal generation unit 320 supplies the generated pixel signal SIG to the column ADC 220.

The address event detection unit 400 detects the presence or absence of an address event on the basis of whether or not a change amount of a photocurrent from each of the light-receiving units 330 exceeds a predetermined threshold. The address event includes an on-event in which the change amount has exceeded an upper limit threshold, and an off-event in which the change amount has fallen below a lower limit threshold, for example. Furthermore, a detection signal of the address event includes one bit indicating a detection result of the on-event and one bit indicating a detection result of the off-event, for example. Note that the address event detection unit 400 can detect only the on-event.

The address event detection unit 400 supplies a request for requesting transmission of a detection signal to the arbiter 213 when the address event has occurred. Then, when receiving a response to the request from the arbiter 213, the address event detection unit 400 supplies the detection signal to the drive circuit 211 and the signal processing unit 212. Note that the address event detection unit 400 is an example of a detection unit described in the claims.

Figure 6:
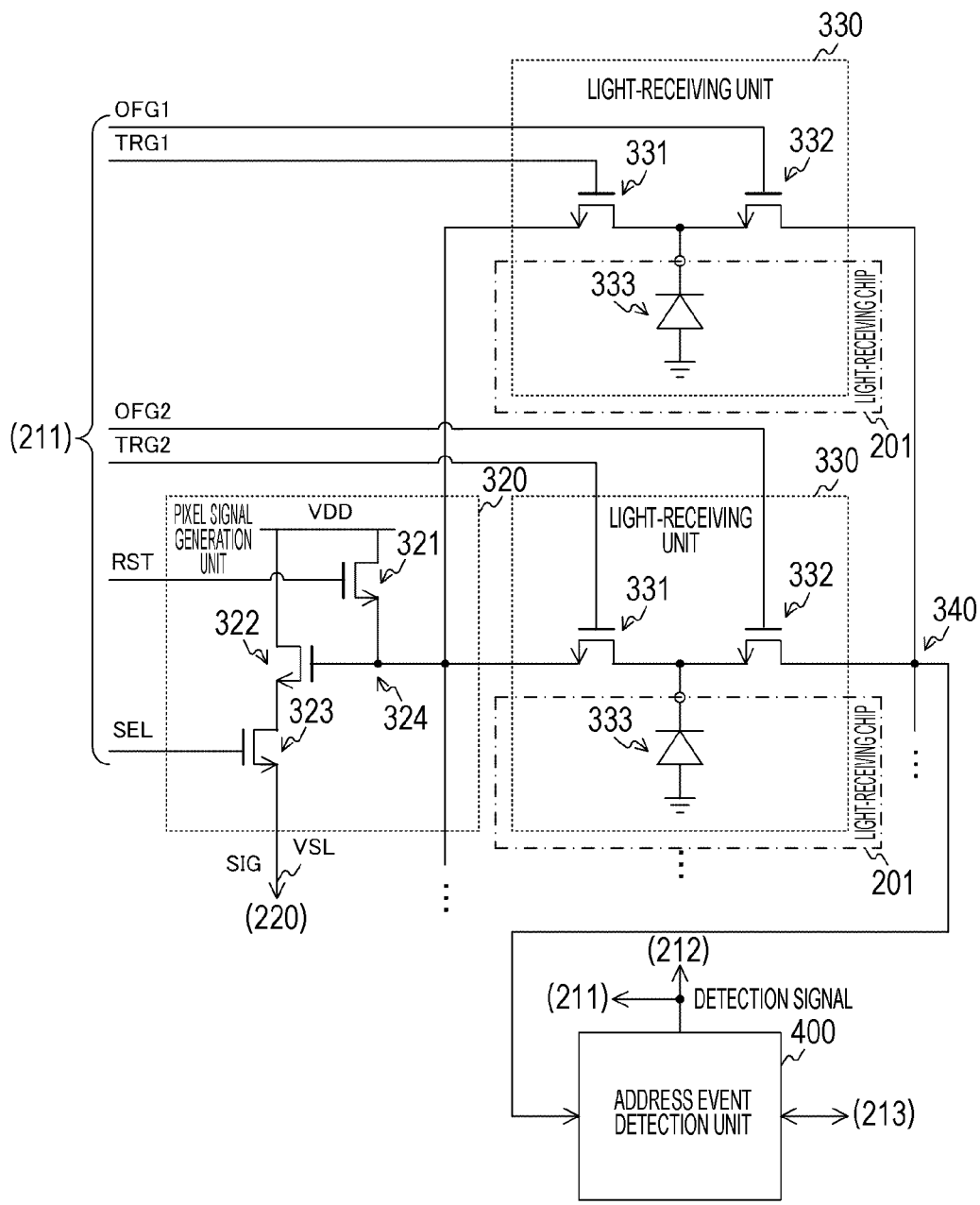
FIG. 6 is a circuit diagram illustrating a configuration example of a pixel signal generation unit and a light-receiving unit according to the first embodiment of the present technology.

FIG. 6 is a circuit diagram illustrating a configuration example of the pixel signal generation unit 320 and the light-receiving unit 330 according to the first embodiment of the present technology. The pixel signal generation unit 320 includes a reset transistor 321, an amplification transistor 322, a selection transistor 323, and a floating diffusion layer 324. The plurality of light-receiving units 330 is commonly connected to the address event detection unit 400 via a connection node 340.

Furthermore, each light-receiving unit 330 includes a transfer transistor 331, an overflow gate (OFG) transistor 332, and a photoelectric conversion element 333. Assuming that the number of pixels in the pixel array unit 300 is 4M×4N, 4M×4N transfer transistors 331, OFG transistors 332, and photoelectric conversion elements 333 are arranged. A transfer signal TRGn' is supplied from the drive circuit 211 to the n'-th (n' is an integer) transfer transistor 331. A control signal OFGn' is supplied from the drive circuit 211 to the n'-th OFG transistor 332.

Furthermore, an N-type metal-oxide-semiconductor (MOS) transistor is used as the reset transistor 321, the amplification transistor 322, and the selection transistor 323, for example. Similarly, an N-type MOS transistor is used as the transfer transistor 331 and the OFG transistor 332.

Furthermore, the photoelectric conversion elements 333 are arranged on the light-receiving chip 201. All the elements other than the photoelectric conversion elements 333 are arranged on the detection chip 202.

The photoelectric conversion element 333 photoelectrically converts the incident light to generate a charge. The transfer transistor 331 transfers the charge from the corresponding photoelectric conversion element 333 to the floating diffusion layer 324 according to the transfer signal TRGn'. The OFG transistor 332 supplies an electrical signal generated by the corresponding photoelectric conversion element 333 to the connection node 340 according to the control signal OFGn'. Here, the supplied electrical signal is a photocurrent including a charge.

The floating diffusion layer 324 accumulates the charge and generates a voltage according to the amount of the accumulated charge. The reset transistor 321 initializes the charge amount of the floating diffusion layer 324 according to a reset signal from the drive circuit 211. The amplification transistor 322 amplifies the voltage of the floating diffusion layer 324. The selection transistor 323 outputs a signal of the amplified voltage as the pixel signal SIG to the column ADC 220 via a vertical signal line VSL according to a selection signal SEL from the drive circuit 211. The vertical signal line VSL is routed along a vertical direction for each column of the FD shared block 301.

When the control unit 130 instructs the drive circuit 211 to start detecting an address event, the drive circuit 211 drives the OFG transistor 332 in the detection block 302 by the control signal OFGn' to supply a photocurrent. Thereby, a current of a sum of photocurrents of all the light-receiving units 330 in the detection block 302 flows through the address event detection unit 400. The value of this current becomes a value corresponding to a light-receiving amount by the entire detection block 302.

Then, when an address event is detected in a certain detection block 302, the drive circuit 211 turns off all the OFG transistors 332 in that block and stops the supply of the photocurrent to the address event detection unit 400.

Here, an overlapping area between the left-side FD shared block 301 and the detection block 302 is a left-side overlapping area, and an overlapping area between the right-side FD shared block 301 and the detection block 302 is a right-side overlapping area.

The drive circuit 211 sequentially drives the transfer transistor 331 to transfer the charge to the floating diffusion layer 324 by the transfer signal TRGn' in the left-side overlapping area. Furthermore, the drive circuit 211 sequentially drives the transfer transistor 331 to transfer the charge to the floating diffusion layer 324 by the transfer signal TRGn' in the right-side overlapping area in parallel to the left side. Thereby, the pixel signals are output in parallel from the left-side overlapping area and the right-side overlapping area. That is, the pixel signals are output from two pixels at a time.

In this way, the solid-state imaging element 200 outputs only the pixel signal of the detection block 302 in which the address event is detected to the column ADC 220. Thereby, power consumption of the solid-state imaging element 200 and a processing amount of the image processing can be reduced as compared with a case where the pixel signals of all the pixels are output regardless of the presence or absence of the address event.

Furthermore, since a plurality of pixels shares the address event detection unit 400, the circuit scale of the solid-state imaging element 200 can be reduced as compared with a case where the address event detection unit 400 is arranged for each pixel.

Moreover, since the detection block 302 is divided by the left-side FD shared block 301 and the right-side FD shared block 301, the drive circuit 211 can cause the pixel signals to be output in parallel from the left-side overlapping area and the right-side overlapping area. Thereby, the speed of AD conversion (that is, readout) can be improved as compared with the case where the pixel signal of one pixel is output at a time from the detection block 302.

[Configuration Example of Address Event Detection Unit]

Figure 7:
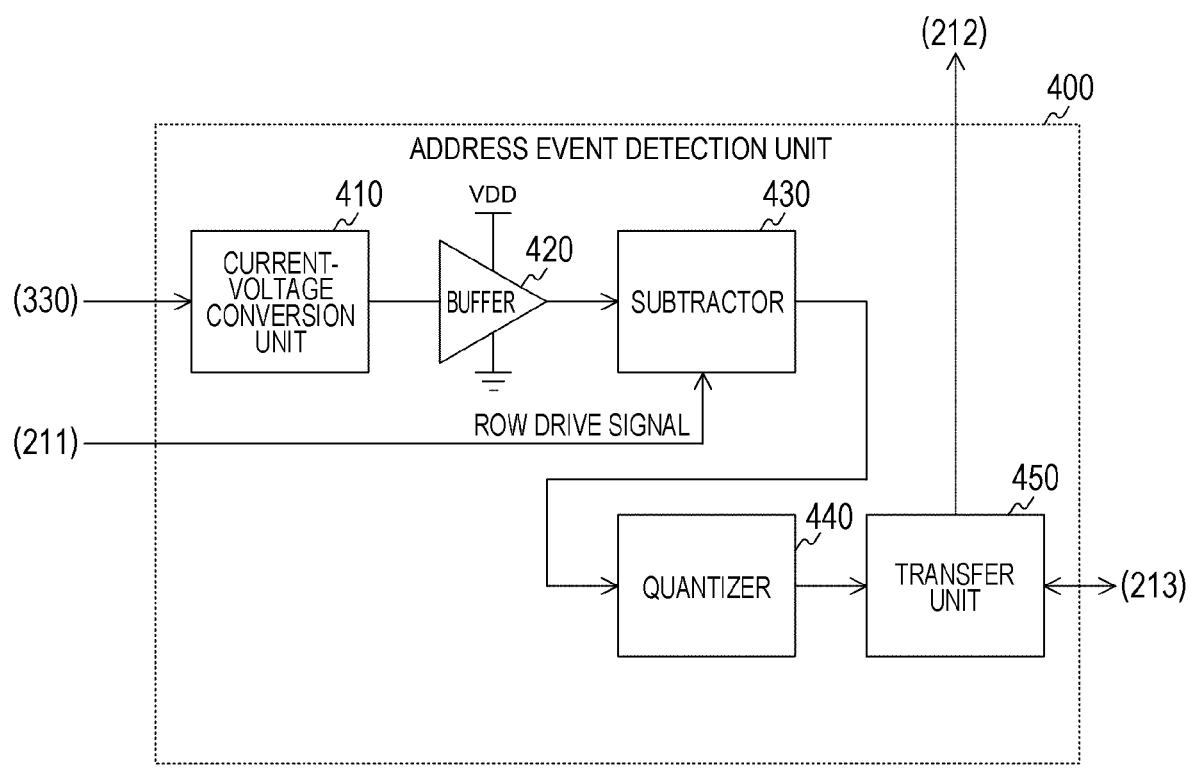
FIG. 7 is a block diagram illustrating a configuration example of an address event detection unit according to the first embodiment of the present technology.

FIG. 7 is a block diagram illustrating a configuration example of the address event detection unit 400 according to the first embodiment of the present technology. The address event detection unit 400 includes a current-voltage conversion unit 410, a buffer 420, a subtractor 430, a quantizer 440, and a transfer unit 450.

The current-voltage conversion unit 410 converts the photocurrent from the corresponding light-receiving unit 330 into a logarithmic voltage signal. The current-voltage conversion unit 410 supplies the voltage signal to the buffer 420.

The buffer 420 outputs the voltage signal from the current-voltage conversion unit 410 to the subtractor 430. The buffer 420 can improve a drive force for driving a rear stage. Furthermore, the buffer 420 can secure isolation of noise associated with a rear-stage switching operation.

The subtractor 430 lowers a level of the voltage signal from the buffer 420 according to a row drive signal from the drive circuit 211. The subtractor 430 supplies the lowered voltage signal to the quantizer 440.

The quantizer 440 quantizes the voltage signal from the subtractor 430 into a digital signal and outputs the digital signal to the transfer unit 450 as a detection signal.

The transfer unit 450 transfers the detection signal from the quantizer 440 to the signal processing unit 212 and the like. The transfer unit 450 supplies a request for requesting transmission of the detection signal to the arbiter 213 when an address event is detected. Then, when receiving a response to the request from the arbiter 213, the transfer unit 450 supplies the detection signal to the drive circuit 211 and the signal processing unit 212.

[Configuration Example of Current-Voltage Conversion Unit]

Figure 8:
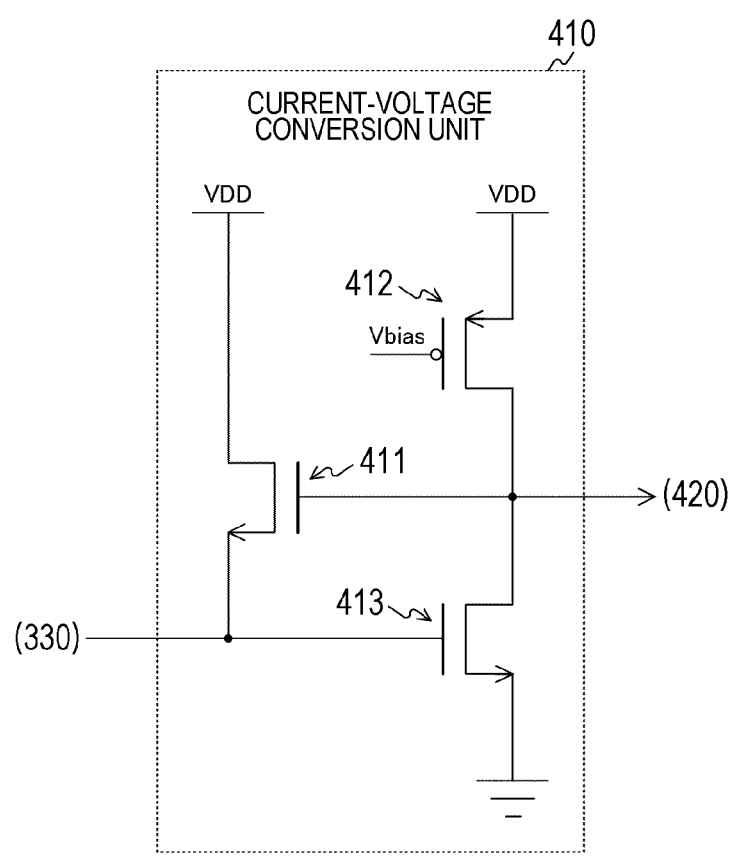
FIG. 8 is a circuit diagram illustrating a configuration example of a current-voltage conversion unit according to the first embodiment of the present technology.

FIG. 8 is a circuit diagram illustrating a configuration example of the current-voltage conversion unit 410 according to the first embodiment of the present technology. The current-voltage conversion unit 410 includes N-type transistors 411 and 413 and a P-type transistor 412. For example, a MOS transistor is used as the transistors.

A source of the N-type transistor 411 is connected to the light-receiving unit 330 and a drain of the N-type transistor 411 is connected to a power supply terminal. The P-type transistor 412 and the N-type transistor 413 are connected in series between the power supply terminal and a ground terminal. Furthermore, a connection point between the P-type transistor 412 and the N-type transistor 413 is connected to a gate of the N-type transistor 411 and an input terminal of the buffer 420. Furthermore, a predetermined bias voltage Vbias is applied to a gate of the P-type transistor 412.

Drains of the N-type transistors 411 and 413 are connected to a power supply side, and such a circuit is called source follower. The photocurrent from the light-receiving unit 330 is converted into a logarithmic voltage signal by these two source followers connected in a loop manner. Furthermore, the P-type transistor 412 supplies a constant current to the N-type transistor 413.

[Configuration Example of Subtractor and Quantizer]

Figure 9:
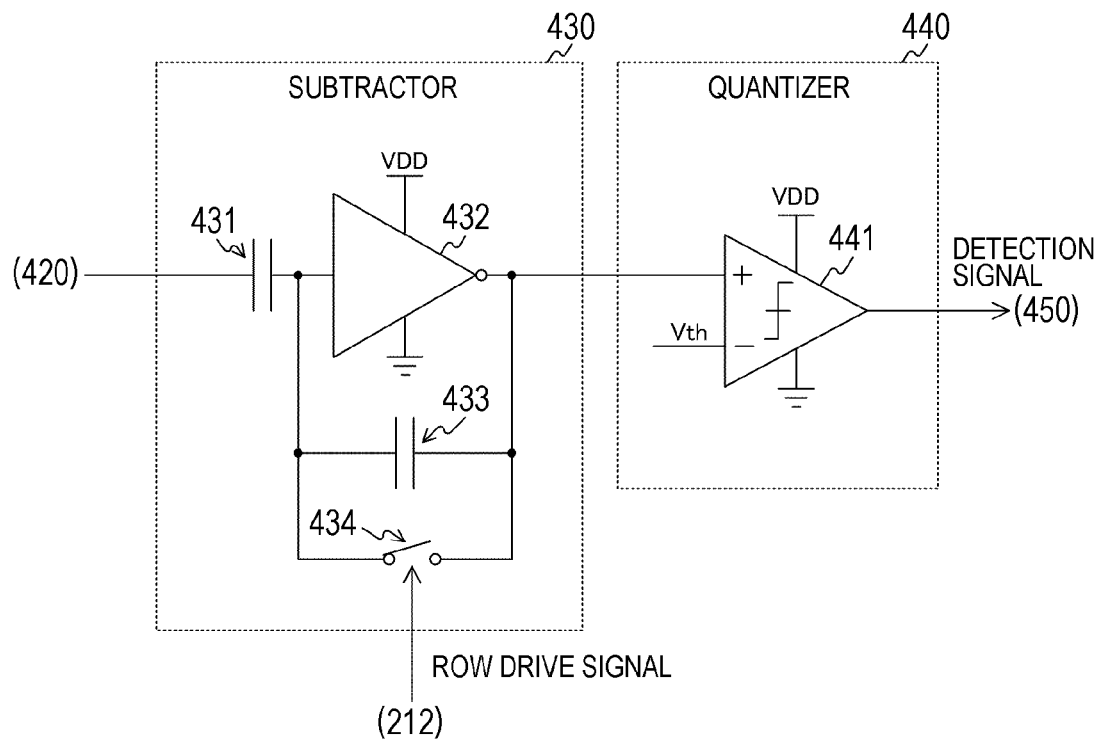
FIG. 9 is a circuit diagram illustrating a configuration example of a subtractor and a quantizer according to the first embodiment of the present technology.

FIG. 9 is a circuit diagram illustrating a configuration example of the subtractor 430 and the quantizer 440 according to the first embodiment of the present technology. The subtractor 430 includes capacitors 431 and 433, an inverter 432, and a switch 434. Furthermore, the quantizer 440 includes a comparator 441.

One end of the capacitor 431 is connected to an output terminal of the buffer 420, and the other end of the capacitor 431 is connected to an input terminal of the inverter 432. The capacitor 433 is connected in parallel with the inverter 432. The switch 434 opens or closes a path connecting both ends of the capacitor 433 according to a row drive signal.

The inverter 432 inverts the voltage signal input via the capacitor 431. The inverter 432 outputs an inverted signal to the non-inverting input terminal (+) of the comparator 441.

When the switch 434 is turned on, a voltage signal $V_{init}$ is input to the buffer 420 side of the capacitor 431, and an opposite side becomes a virtual ground terminal. A potential of this virtual ground terminal is set to zero for convenience. At this time, a potential $Q_{init}$ accumulated in the capacitor 431 is expressed by the following expression, where C1 is a capacitance of the capacitor 431. Meanwhile, since both ends of the capacitor 433 are short-circuited, the accumulated charge is zero.

Next, considering a case where the switch 434 is turned off and the voltage on the buffer 420 side of the capacitor 431 changes to $V_{after}$, a charge $Q_{after}$ accumulated in the capacitor 431 is expressed by the following expression.

$$Q_{after} = C1 \times V_{after} \qquad \text{Expression 2}$$

Meanwhile, a charge Q2 accumulated in the capacitor 433 is expressed by the following expression, where an output voltage is $V_{out}$.

$$Q2 = -C2 \times V_{out} \qquad \text{Expression 3}$$

At this time, a total charge amount of the capacitors 431 and 433 does not change, and therefore the following expression holds.

$$Q_{init}=Q_{after}+Q2 \qquad \text{Expression 4}$$

By substituting Expressions 1 to 3 into Expression 4 and transforming the expression, the following expression is obtained.

$$V_{out}=-(C1/C2)\times(V_{after}-V_{init}) \qquad \text{Expression 5}$$

The expression 5 expresses a subtraction operation of the voltage signal, and a gain of the subtraction result is C1/C2. Since it is usually desired to maximize the gain, it is favorable to design C1 large and C2 small. Meanwhile, if C2 is too small, kTC noise increases, and noise characteristics may deteriorate. Therefore, the capacitance reduction of C2 is limited to a range in which noise is tolerable. Furthermore, since the address event detection unit 400 including the subtractor 430 is mounted for each detection block 302, there is a restriction on the area of the capacitances C1 and C2. The values of the capacitances C1 and C2 are determined in consideration of the above matters.

The comparator 441 compares the voltage signal from the subtractor 430 with a predetermined threshold voltage Vth applied to an inverting input terminal (−). The comparator 441 outputs a signal indicating a comparison result to the transfer unit 450 as a detection signal.

Furthermore, a gain A of the entire address event detection unit 400 is expressed by the following expression, where a conversion gain of the current-voltage conversion unit 410 is $CG_{log}$ and a gain of the buffer 420 is "1".

[Math. 1]

$$A = \frac{CG_{log}\cdot C1}{C2}\sum_{n=1}^{K} i_{photo\_k} \qquad \text{Expression 6}$$

In the above expression, $i_{photo\_k}$ is the photocurrent of the k-th pixel, and the unit is, for example, amperes (A). K is the number of pixels in the detection block 302.

[Configuration Example of Column ADC]

Figure 10:
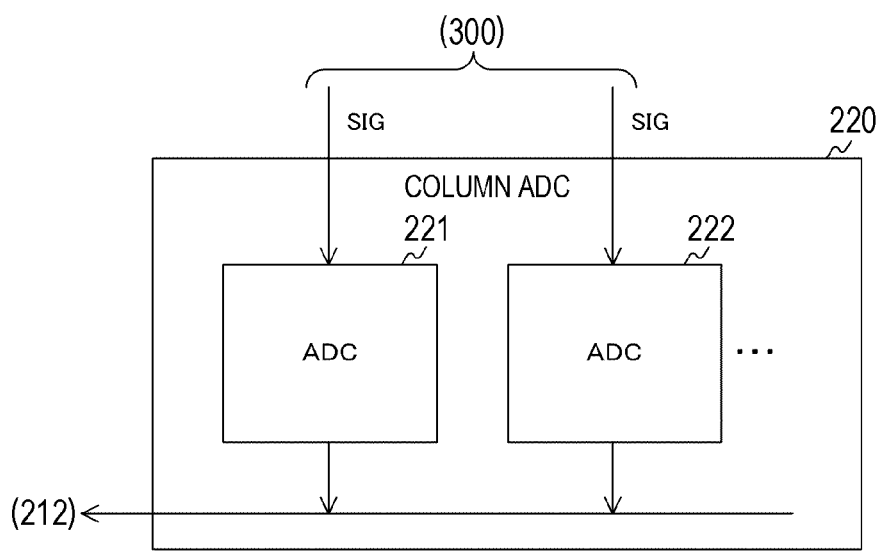
FIG. 10 is a block diagram illustrating a configuration example of a column analog-to-digital converter (ADC) according to the first embodiment of the present technology.

FIG. 10 is a block diagram illustrating a configuration example of the column ADC 220 according to the first embodiment of the present technology. The column ADC 220 includes a plurality of ADCs such as ADCs 221 and 222. The ADC 221 is connected to the left-side FD shared block 301 and the ADC 222 is connected to the right-side FD shared block 301.

The ADC 221 converts the analog pixel signal SIG supplied via the vertical signal line VSL into a digital signal. The pixel signal SIG is converted into the digital signal having a larger bit depth than the detection signal. For example, it is assumed that the detection signal is two bits, the pixel signal is converted into the digital signal of three or higher bits (sixteen bits, for example). The ADC 221 supplies the generated digital signal to the signal processing unit 212. The configuration of the ADC 222 is similar to that of the ADC 221. Note that the ADC 221 is an example of a first analog-digital converter described in the claims, and the ADC 222 is an example of a second analog-digital converter described in the claims.

[Operation Example of Solid-State Imaging Element]

Figure 11:
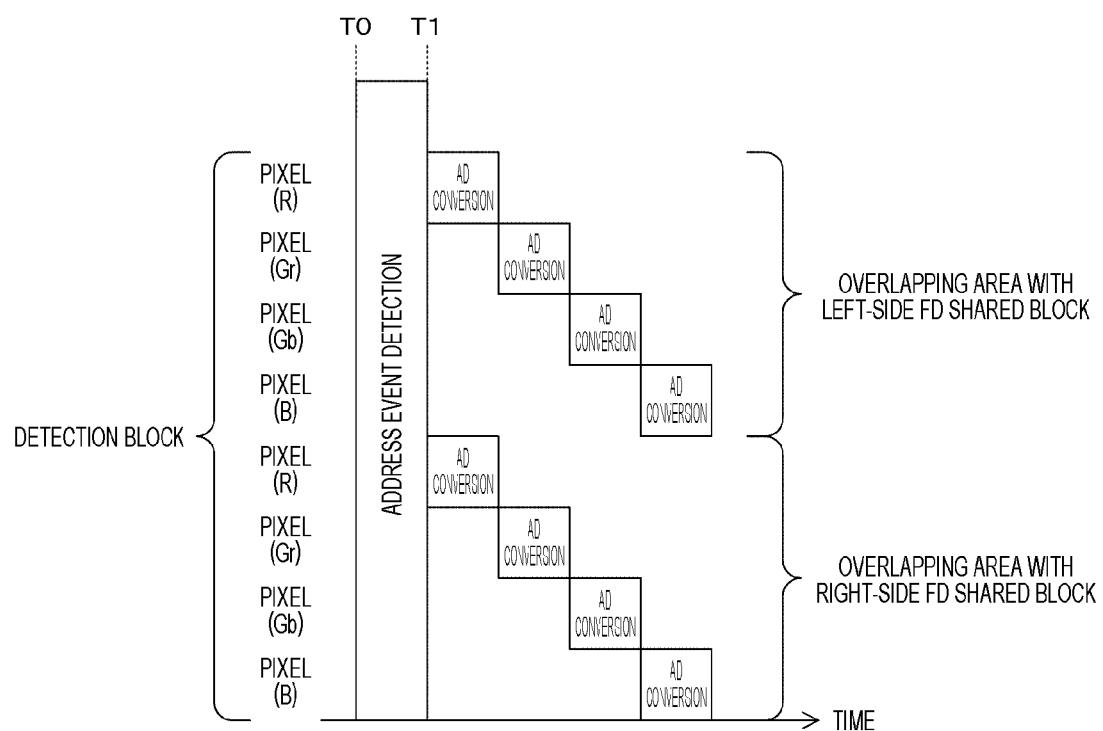
FIG. 11 is a timing chart illustrating an example of a readout control according to the first embodiment of the present technology.

FIG. 11 is a timing chart illustrating an example of readout control according to the first embodiment of the present technology. At timing T0, when the start of detection of the address event is instructed, the drive circuit 211 drives the eight pixels in the detection block 302 to start the detection of the address event. At timing T1, when the address event is detected in the detection block 302, the drive circuit 211 sequentially drives the four pixels in the overlapping area with the left-side FD shared block 301 to output the pixel signals. The ADC 221 sequentially performs AD conversion for the left-side pixel signals. Furthermore, the drive circuit 211 sequentially drives the four pixels in the overlapping area with the right-side FD shared block 301 to output the pixel signals. The ADC 222 operates in parallel with the ADC 221 and sequentially performs AD conversion for the right-side pixel signals.

Here, a configuration in which the eight pixels in the detection block 302 share one floating diffusion layer is assumed. In this configuration, the pixel signals of the eight pixels need to be sequentially AD-converted one by one at the time of detection the address event. In contrast, in the configuration in which the eight pixels are divided into two groups, and each four pixels share the floating diffusion layer, two pixels can be AD-converted at a time by the ADCs 221 and 222. Thereby, the readout speed can be improved.

Figure 12:
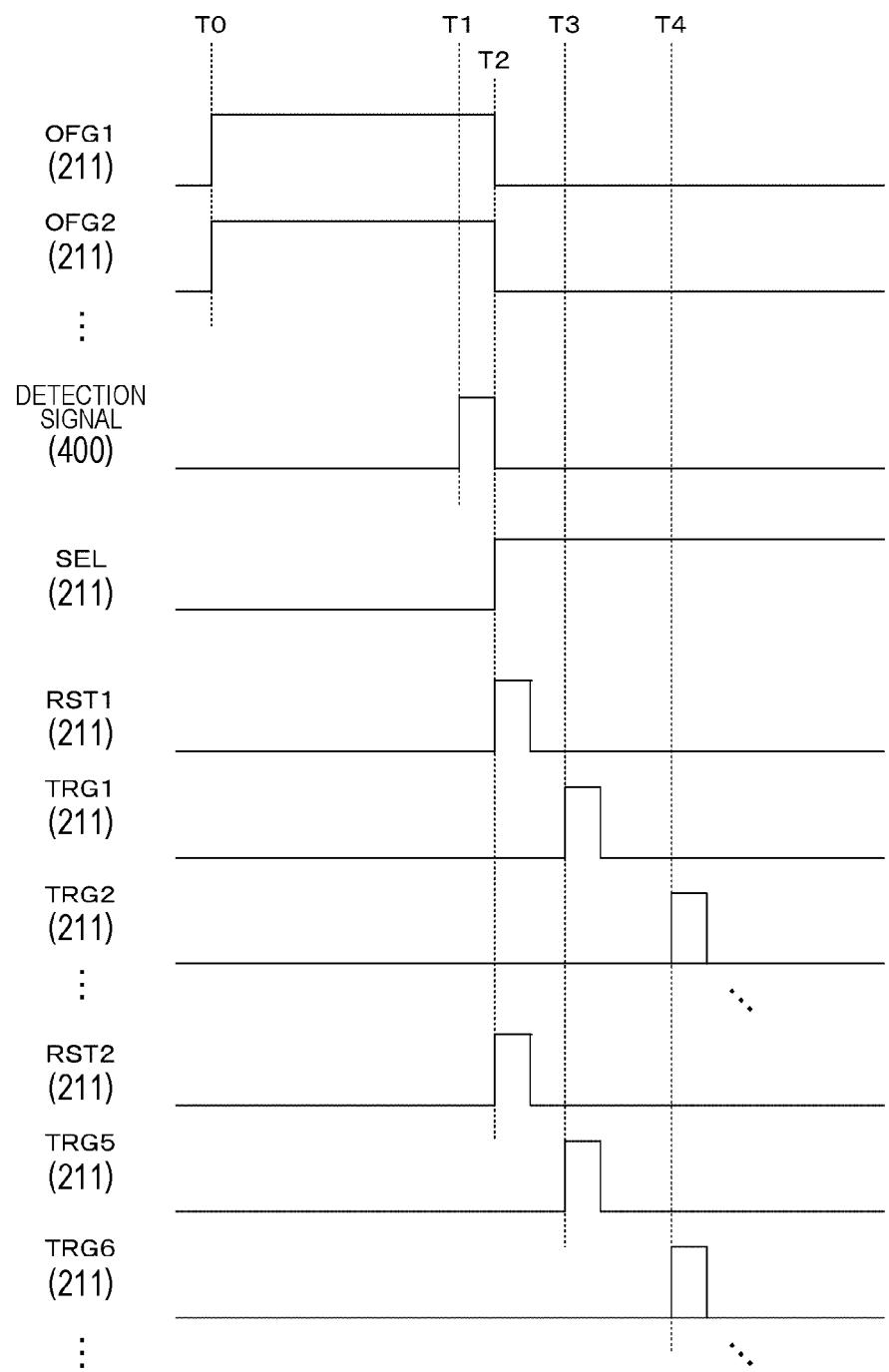
FIG. 12 is a timing chart illustrating an example of an operation of the solid-state imaging element according to the first embodiment of the present technology.

FIG. 12 is a timing chart illustrating an example of the operation of the solid-state imaging element 200 according to the first embodiment of the present technology. At timing T0, when the control unit 130 instructs the start of detection of the address event, the drive circuit 211 sets all the control signals OFGn' to high level and turns on the OFG transistors 332 of all the pixels in the detection block 302. As a result, the sum of the photocurrents of all the pixels is supplied to the address event detection unit 400. Meanwhile, the transfer signals TRGn' are all at low level, and the transfer transistors 331 of all the pixels in the detection block 302 are in an off state.

Then, at timing T1, it is assumed that the address event detection unit 400 detects the address event and outputs a high-level detection signal. Here, it is assumed that the detection signal is a one-bit signal indicating an on-event detection result.

When receiving the detection signal, at timing T2, the drive circuit 211 sets all the control signals OFGn' in the detection block 302 in which the address event is detected to the low level, and stops the supply of the photocurrent to the address event detection unit 400. Furthermore, the drive circuit 211 sets the selection signal SEL in the detection block 302 to the high level and sets reset signals RST1 and RST2 to the high level for a fixed pulse period to initialize the right-side and left-side floating diffusion layers 324. The right-side and left-side pixel signal generation units 320 output the voltage at the time of initialization as a reset level, and the ADCs 221 and 222 convert the reset level into a digital signal.

At timing T3 after the reset level conversion, the drive circuit 211 supplies a high-level transfer signal TRG1 over a fixed pulse period and causes the first pixel in the left-side FD shared block 301 to output the voltage as a signal level. Furthermore, the drive circuit 211 causes the first pixel in the right-side FD shared block 301 to output the voltage as a signal level by a transfer signal TRG5. The ADCs 221 and 222 convert the signal levels into digital signals. The signal processing unit 212 obtains a difference between the reset level and the signal level as a net pixel signal. This processing is called CDS processing.

At timing T4 after the signal level conversion, the drive circuit 211 supplies high-level transfer signals TRG2 and TRG6 over a fixed pulse period to cause the second pixels in the right-side and left-side FD shared blocks 301 to output the signal levels. The signal processing unit 212 obtains a difference between the reset level and the signal level as a net pixel signal. Hereinafter, similar processing is executed, and two pixel signals are output at a time.

When all the pixel signals are output, the drive circuit 211 sets all the control signals OFGn' to the high level and turns on the OFG transistors 332 of all the pixels.

Figure 13:
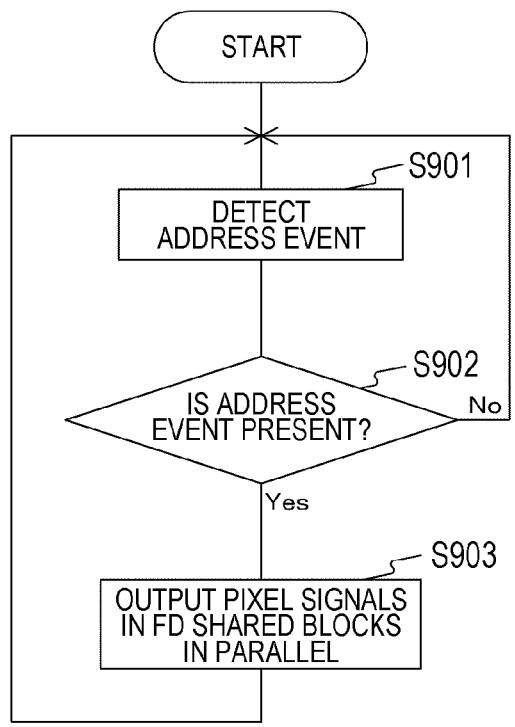
FIG. 13 is a flowchart illustrating an example of an operation of the solid-state imaging element according to the first embodiment of the present technology.

FIG. 13 is a flowchart illustrating an example of an operation of the solid-state imaging element 200 according to the first embodiment of the present technology. This operation is started when, for example, a predetermined application for detecting an address event is executed.

Each of the detection blocks 302 detects the presence or absence of the address event (step S901). The drive circuit 211 determines whether or not the address event is present in any of the detection blocks 302 (step S902). In a case where the address event is present (step S902: Yes), the drive circuit 211 causes the pixel signals in the right-side and left-side FD shared blocks 301 to be output in parallel in the detection block 302 where the address event has occurred (step S903).

In a case where no address event is present (step S902: No) or after step S903, the solid-state imaging element 200 repeats step S901 and the subsequent steps.

Figure 14:
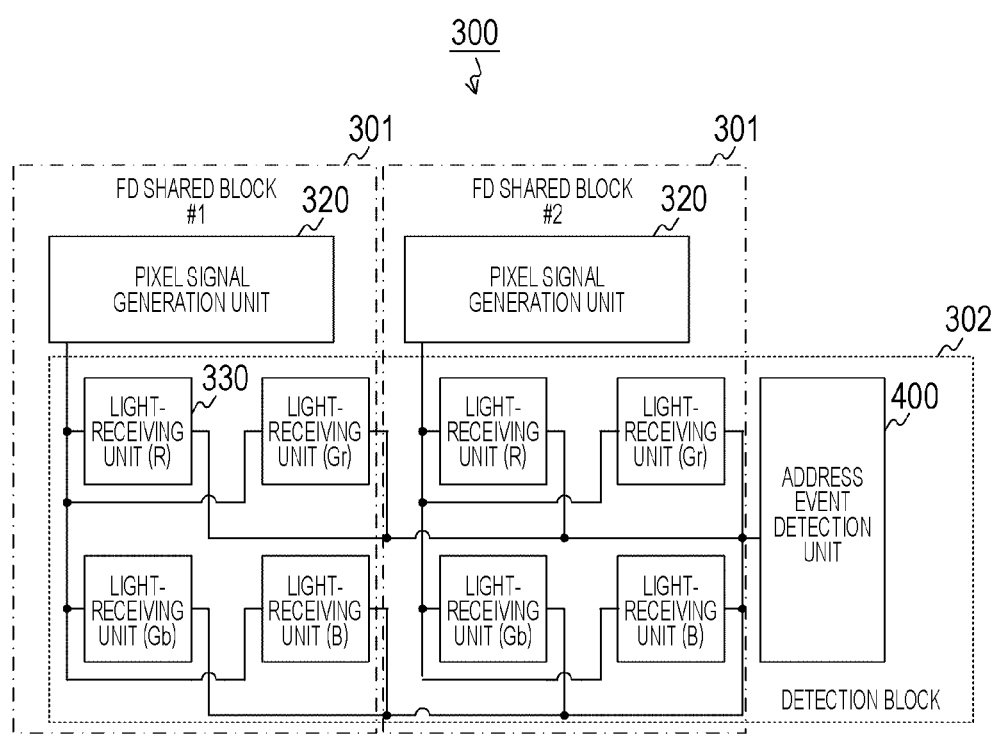
FIG. 14 is a block diagram illustrating a configuration example of the pixel array unit in which the size of a floating diffusion (FD) shared block according to the first embodiment of the present technology is changed.

Note that the array of the FD shared block 301 is not limited to the two rows×four columns as long as the array can divide the detection block 302. For example, as illustrated in FIG. 14, the FD shared block 301 can have two rows×two columns, and the right-side and left-side entire FD shared blocks 301 can be arranged in the detection block 302.

Figure 15:
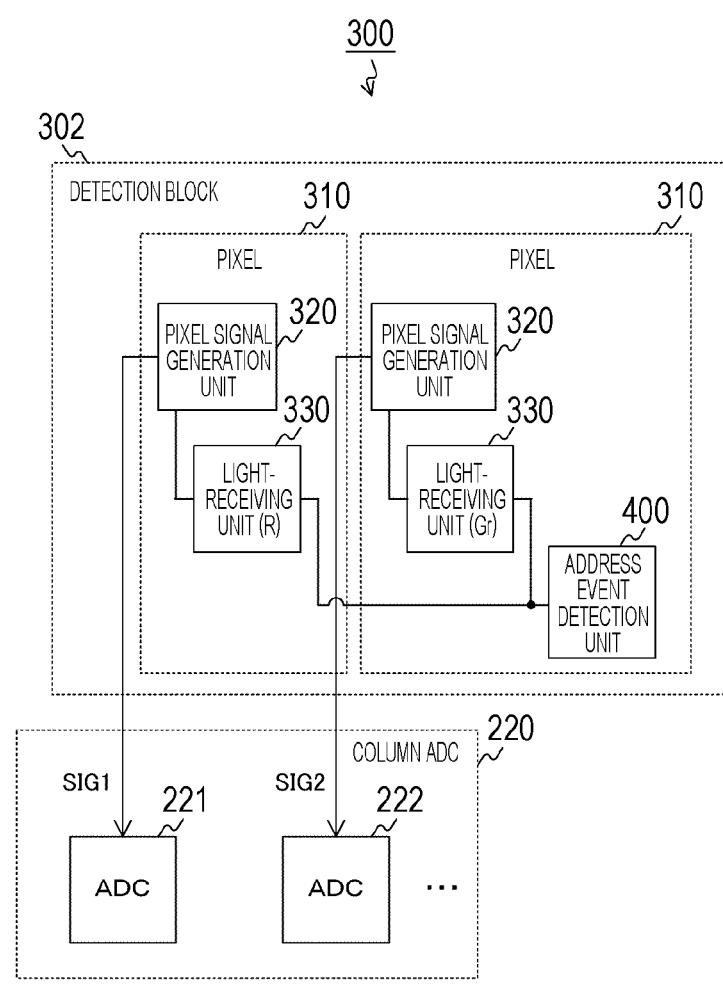
FIG. 15 is a block diagram illustrating a configuration example of a pixel array unit that does not share an FD according to the first embodiment of the present technology.

Furthermore, the plurality of pixels shares the floating diffusion layer. However, a configuration in which the pixels do not share the floating diffusion layer can be adopted, as illustrated in FIG. 15, for example. In this case, two or more columns (for example, two columns) of pixels 310 are arrayed in the detection block 302. Furthermore, the pixel signal generation unit 320 is arranged for each pixel. Then, in the column ADC 220, ADCs such as the ADCs 221 and 222 are arrayed for each column. When the address event is detected, the left-side pixel 310 and the right-side pixel 310 respectively generate the pixel signals, and the ADCs 221 and 222 perform AD conversion for the right-side and left-side pixel signals in parallel. Note that the left-side pixel 310 is an example of a first pixel described in the claims, and the right-side pixel 310 is an example of a second pixel described in the claims.

Furthermore, the detection block 302 can be divided into three or more blocks by the FD shared block 301. For example, in a case where the FD shared block 301 has four rows×one column, the detection block 302 can be divided into four blocks.

As described above, according to the first embodiment of the present technology, the detection block 302 is divided by the right-side and left-side FD shared blocks 301. Therefore, the pixel signals of the blocks can be AD-converted in parallel by the ADCs 221 and 222. Since the image data can be obtained by the AD conversion, the present embodiment can be adopted to applications such as image recognition that requires capture of image data while detecting an address event. Furthermore, since the ADCs 221 and 222 perform the AD conversion for two pixels in parallel, the speed of the AD conversion (readout) can be improved as compared with the case where the pixel signals of the pixels in the detection block 302 are AD-converted one by one.

[First Modification]

In the above-described first embodiment, the elements other than the photoelectric conversion element 333 have been arranged on the detection chip 202, but in this configuration, the circuit scale of the detection chip 202 may increase as the number of pixels increases. The solid-state imaging element 200 according to a first modification of the first embodiment is different from that of the first embodiment in reducing the circuit scale of the detection chip 202.

Figure 16:
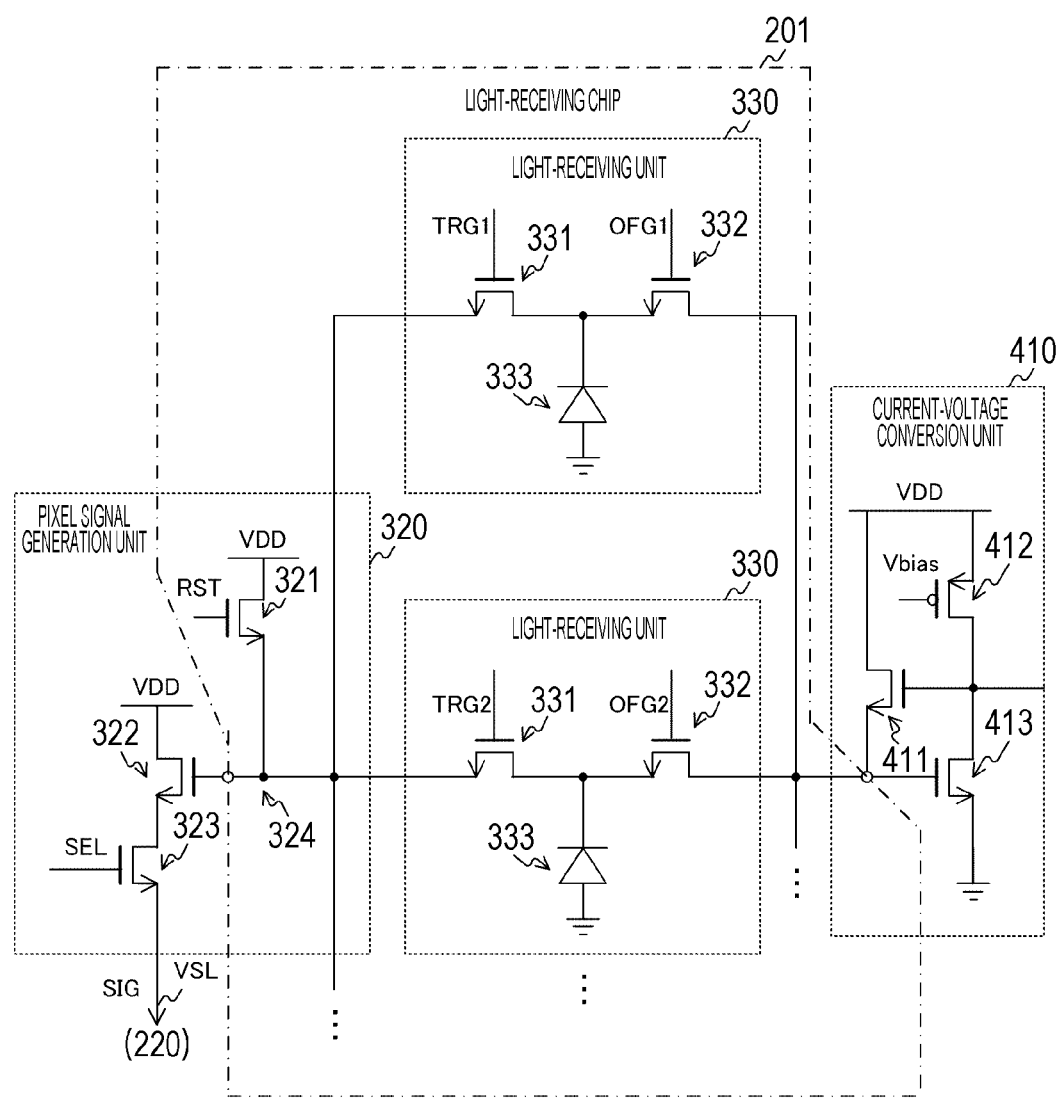
FIG. 16 is a circuit diagram illustrating a configuration example of a pixel array unit according to a first modification of the first embodiment of the present technology.

FIG. 16 is a circuit diagram illustrating a configuration example of the pixel array unit 300 according to the first modification of the first embodiment of the present technology. The pixel array unit 300 of the first modification of the first embodiment is different from that of the first embodiment in that the reset transistor 321, the floating diffusion layer 324, and the plurality of light-receiving units 330 are arranged on the light-receiving chip 201. Elements other than the above elements are arranged on the detection chip 202.

As described above, according to the first modification of the first embodiment of the present technology, the reset transistor 321 and the like and the plurality of light-receiving units 330 are arranged on the light-receiving chip 201. Therefore, the circuit scale of the detection chip 202 can be reduced as compared with the first embodiment.

[Second Modification]

In the above-described first modification of the first embodiment, the reset transistor 321 and the like and the plurality of light-receiving units 330 have been arranged on the light-receiving chip 201, but the circuit scale of the detection chip 202 may increase as the number of pixels increases. The solid-state imaging element 200 according to a second modification of the first embodiment is different from that of the first modification of the first embodiment in further reducing the circuit scale of the detection chip 202.

Figure 17:
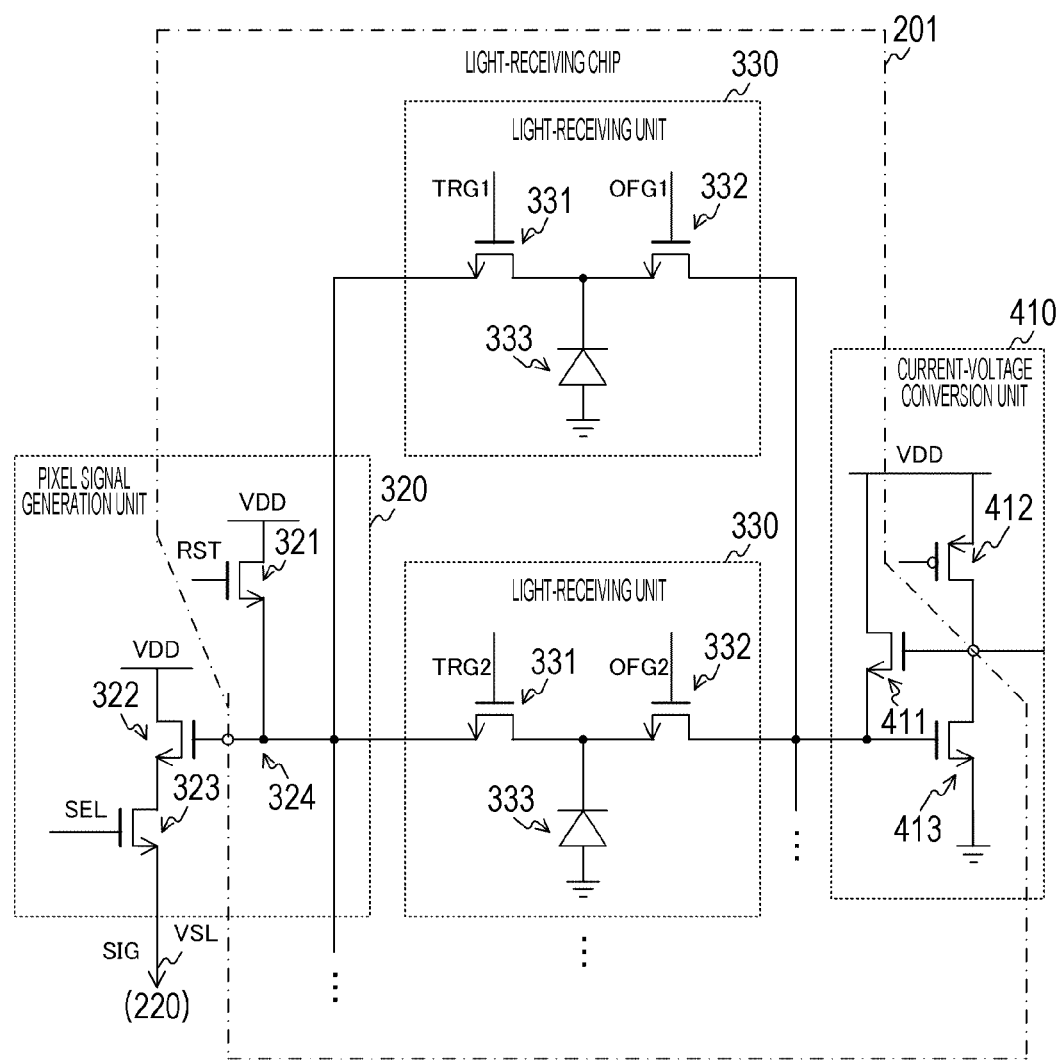
FIG. 17 is a circuit diagram illustrating a configuration example of a pixel array unit according to a second modification of the first embodiment of the present technology.

FIG. 17 is a circuit diagram illustrating a configuration example of the pixel array unit 300 according to the second modification of the first embodiment of the present technology. The pixel array unit 300 of the second modification of the first embodiment is different from that of the first modification of the first embodiment in that the N-type transistors 411 and 413 are further arranged on the light-receiving chip 201. As described above, by using only N-type transistors as the transistors in the light-receiving chip 201, the number of steps for forming the transistors can be reduced as compared with the case where N-type transistors and P-type transistors are mixed. Thereby, the manufacturing cost of the light-receiving chip 201 can be reduced.

As described above, according to the second modification of the first embodiment of the present technology, the N-type transistors 411 and 413 are further arranged on the light-receiving chip 201. Therefore, the circuit scale of the detection chip 202 can be reduced as compared with the first modification of the first embodiment.

[Third Modification]

In the above-described second modification of the first embodiment, the N-type transistors 411 and 413 have been further arranged on the light-receiving chip 201, but the circuit scale of the detection chip 202 may increase as the number of pixels increases. The solid-state imaging element 200 according to a third modification of the first embodiment is different from that of the second modification of the first embodiment in further reducing the circuit scale of the detection chip 202.

Figure 18:
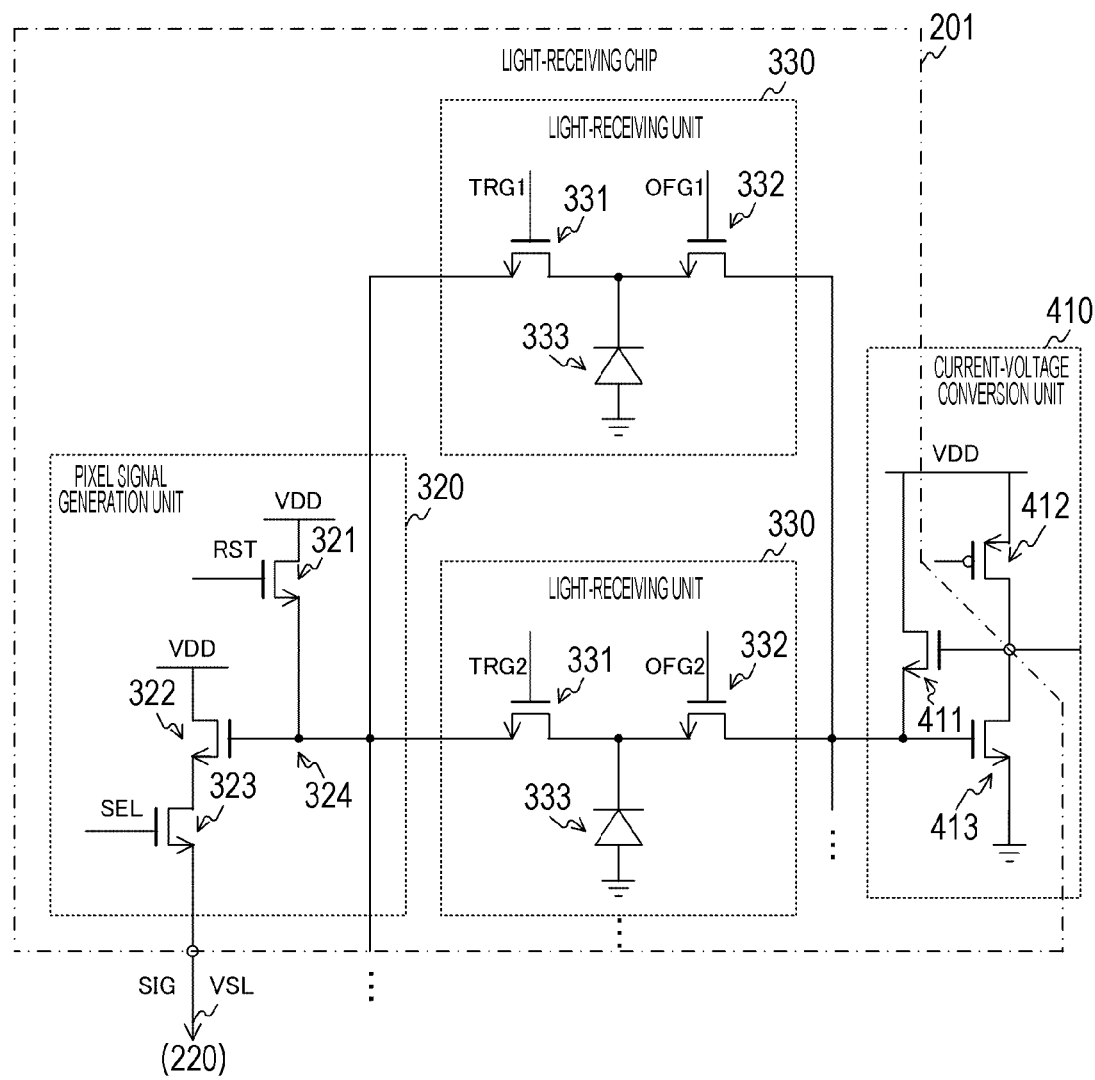
FIG. 18 is a circuit diagram illustrating a configuration example of a pixel array unit according to a third modification of the first embodiment of the present technology.

FIG. 18 is a circuit diagram illustrating a configuration example of the pixel array unit 300 according to the third modification of the first embodiment of the present technology. The pixel array unit 300 of the third modification of the first embodiment is different from that of the second modification of the first embodiment in that the amplification transistor 322 and the selection transistor 323 are further arranged on the light-receiving chip 201. That is, the entire pixel signal generation unit 320 is arranged on the light-receiving chip 201.

As described above, according to the third modification of the first embodiment of the present technology, the pixel signal generation unit 320 is further arranged on the light-receiving chip 201. Therefore, the circuit scale of the detection chip 202 can be reduced as compared with the second modification of the first embodiment.

2. Second Embodiment

In the above-described first embodiment, the light-receiving unit 330 provided with the OFG transistor 332 and the like has been arranged for each pixel, but the circuit scale increases as the number of pixels increases. A solid-state imaging element 200 according to a second embodiment is different from that in the first embodiment in reducing OFG transistors 332 of some pixels.

Figure 19:
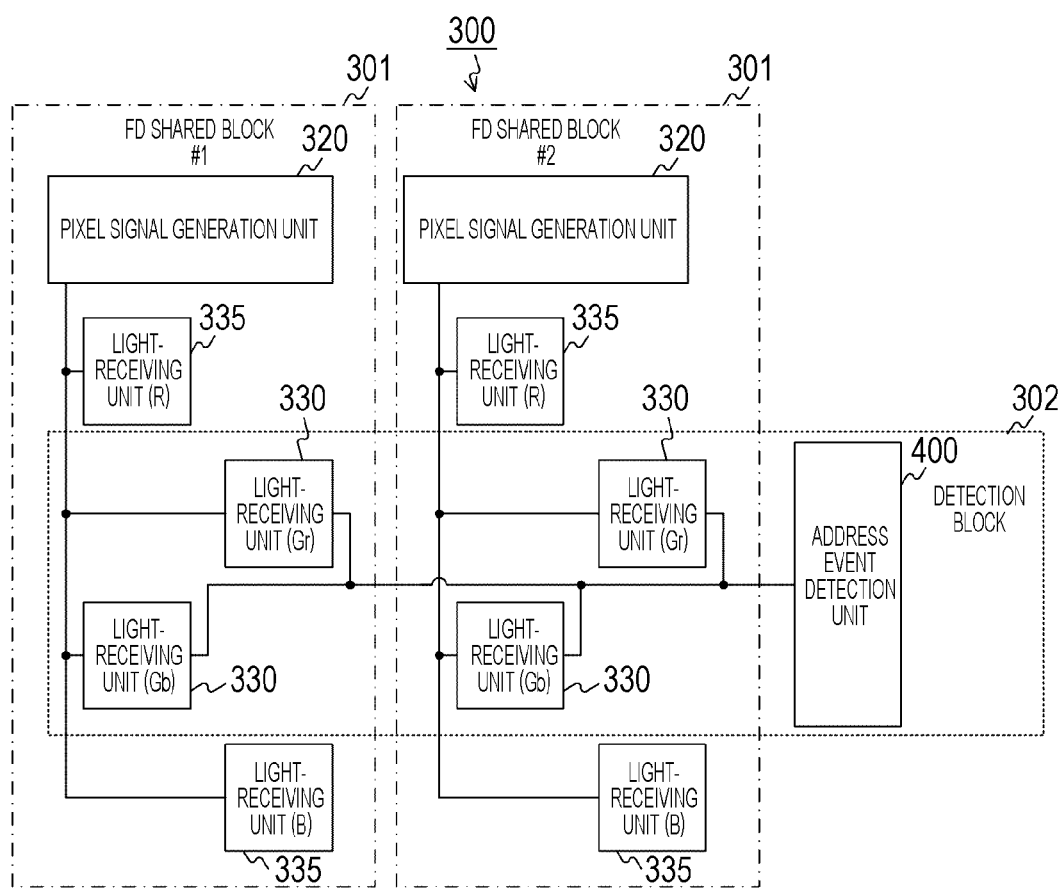
FIG. 19 is a block diagram illustrating a configuration example of a pixel array unit according to a second embodiment of the present technology.

FIG. 19 is a block diagram illustrating a configuration example of a pixel array unit 300 according to the second embodiment of the present technology. The pixel array unit 300 of the second embodiment is different from that of the first embodiment in that a part of an FD shared block 301 overlaps with a detection block 302 and the rest does not overlap with any of detection blocks 302. For example, the FD shared block 301 has two rows×two columns, and two out of four pixels are arranged in the detection block 302, and no address event is detected for the rest of the four pixels.

In FIG. 19, four light-receiving units 330 and four light-receiving units 335 are arranged, and the four light-receiving units 330 are connected to an address event detection unit 400. Furthermore, the two light-receiving units 330 and the two light-receiving units 335 are connected to a left-side pixel signal generation unit 320, and the remaining light-receiving units 330 and 335 are connected to a right-side pixel signal generation unit 320.

Figure 20:
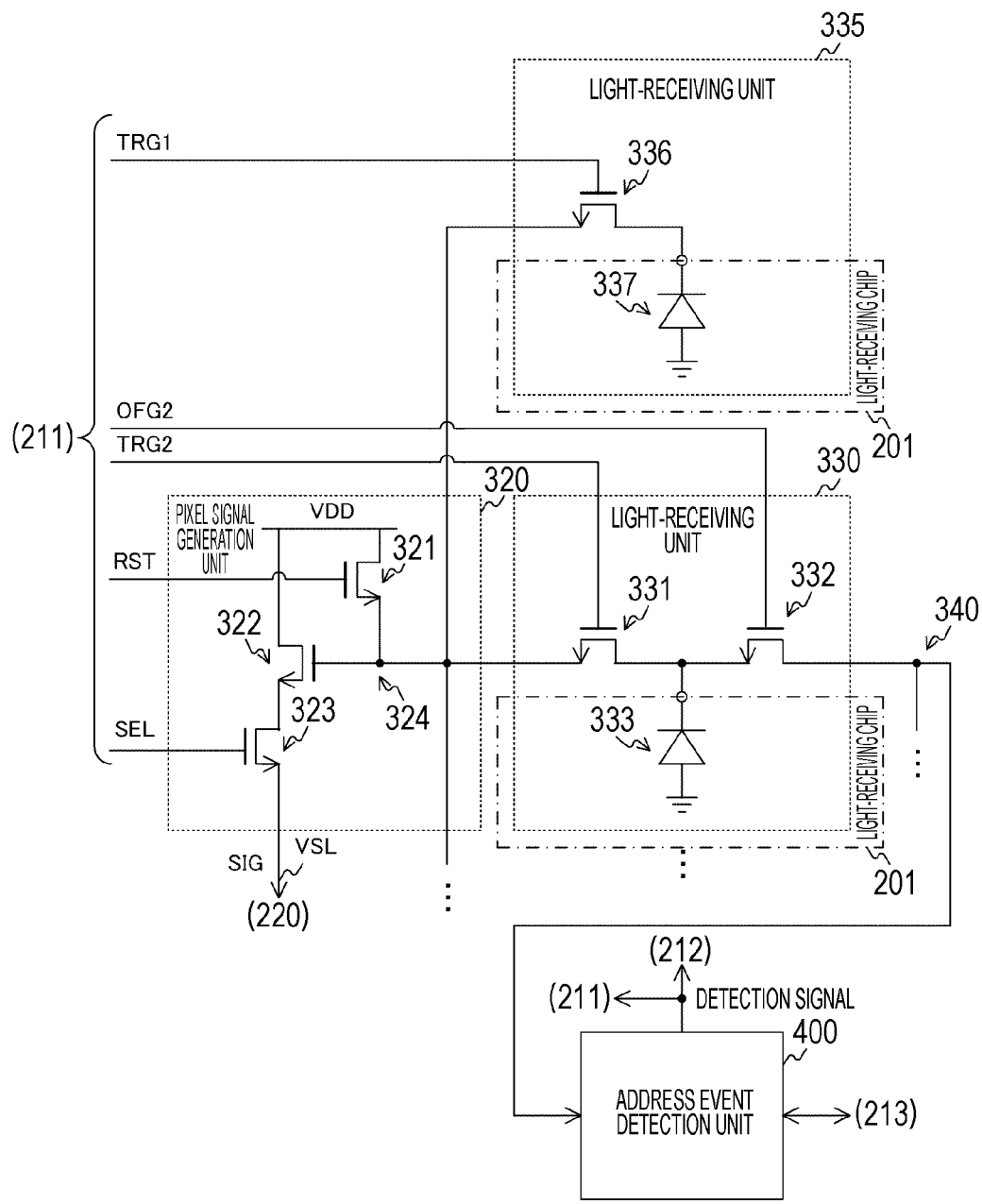
FIG. 20 is a circuit diagram illustrating a configuration example of a pixel signal generation unit and light-receiving units according to the second embodiment of the present technology.

FIG. 20 is a circuit diagram illustrating a configuration example of the pixel signal generation unit 320 and the light-receiving units 330 and 335 according to the second embodiment of the present technology.

The light-receiving unit 335 includes a transfer transistor 336 and a photoelectric conversion element 337. For example, as the transfer transistor 336, an N-type MOS transistor is used. The transfer transistor 336 transfers a charge from the photoelectric conversion element 337 to a floating diffusion layer 324 according to a transfer signal TRG. Since the light-receiving unit 335 is not provided with an OFG transistor 332, the circuit scale can be reduced accordingly.

As described above, according to the second embodiment of the present technology, since a part of the FD shared block 301 is not arranged in the detection block 302, the OFG transistor 332 of that part can be reduced. Thereby, the circuit scale of the pixel array unit 300 can be reduced.

3. Third Embodiment

In the above-described first embodiment, the detection block 302 having a fixed number of pixels such as eight pixels in two rows×four columns has been provided. However, an object is captured large in the vicinity of a periphery of an image or the like. Therefore, even if the number of pixels (that is, the size) in the horizontal direction or the vertical direction is increased in the unit of detection (that is, the detection block 302) of the address event, the recognition accuracy of image recognition is unlikely to decrease. A solid-state imaging element 200 according to a third embodiment is different from that of the first embodiment in changing the size of a detection block 302 according to the position in a pixel array unit 300.

Figure 21:
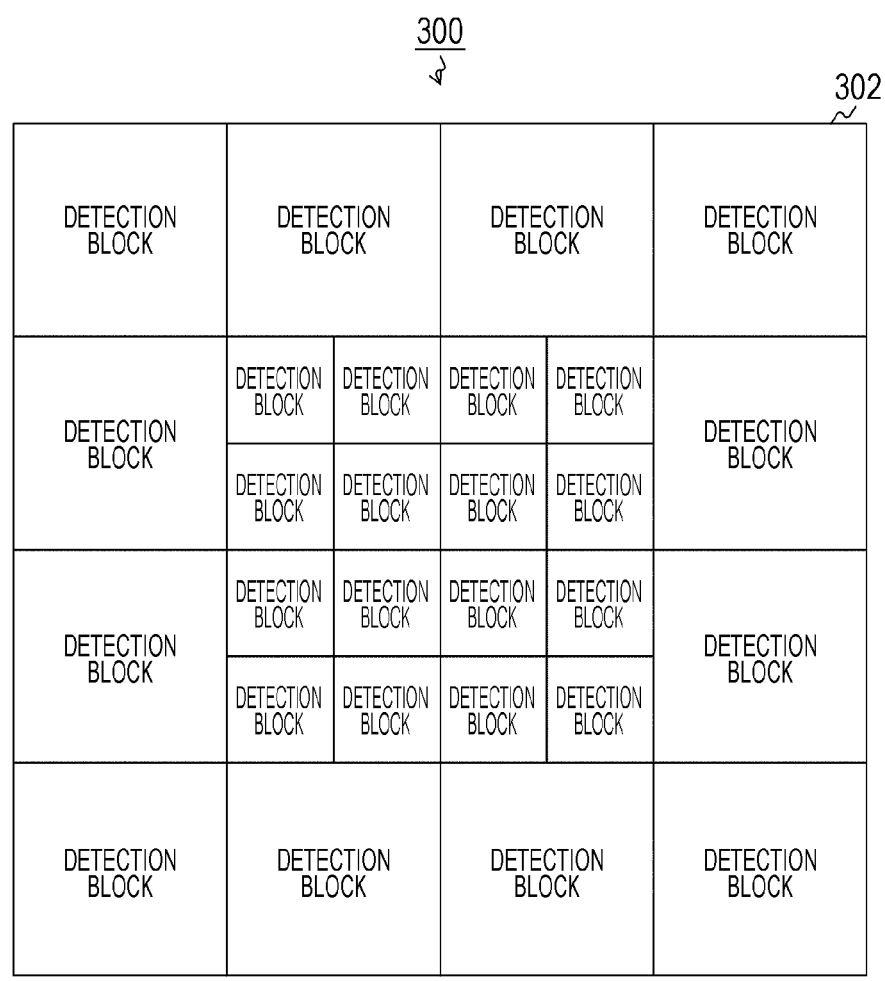
FIG. 21 is a diagram illustrating an arrangement example of detection blocks according to a third embodiment of the present technology.

FIG. 21 is a diagram illustrating an arrangement example of the detection blocks 302 according to the third embodiment of the present technology. A drive circuit 211 of the third embodiment can control the size of the detection block 302. As illustrated in FIG. 21, the drive circuit 211 makes the size of the detection block 302 larger within a certain distance from a periphery of the pixel array unit 300 than the size of the detection block 302 outside the certain distance from the periphery. For example, the horizontal and vertical sizes of the detection block 302 in the vicinity of the periphery are set to be twice as large as those in the vicinity of the center.

Figure 22:
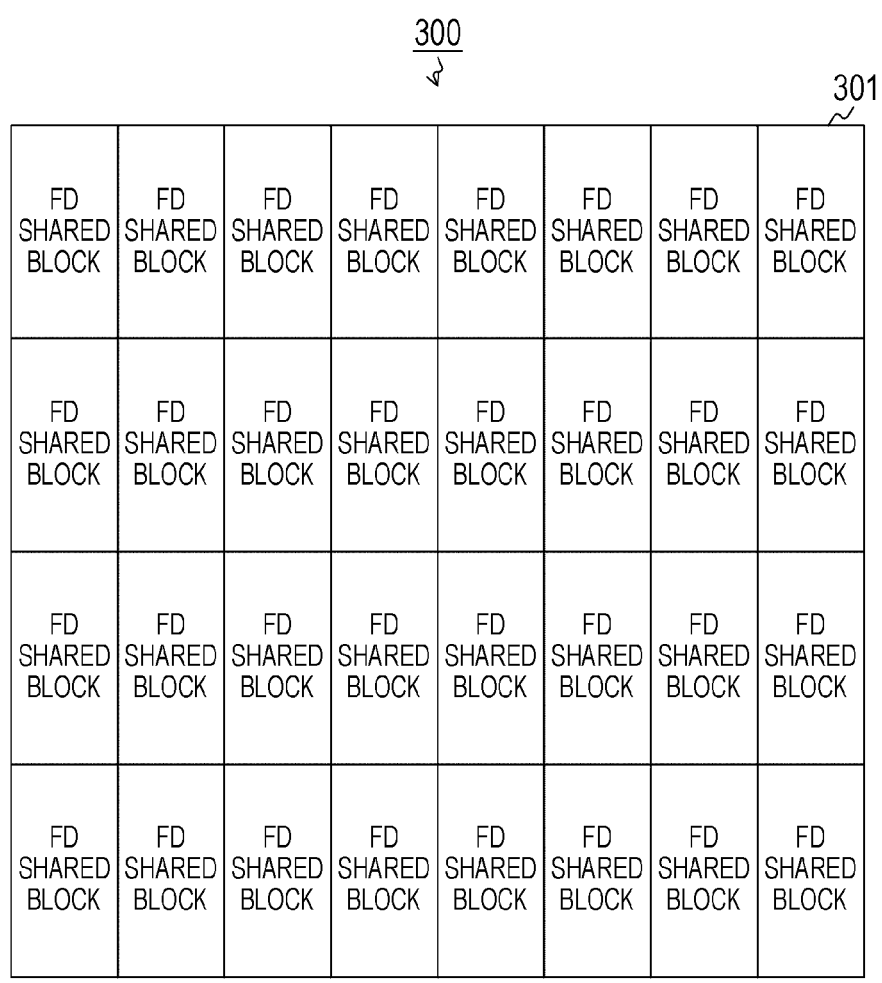
FIG. 22 is a diagram illustrating an arrangement example of FD shared blocks according to the third embodiment of the present technology.

FIG. 22 is a diagram illustrating an arrangement example of FD shared blocks 301 according to the third embodiment of the present technology. As illustrated in FIG. 22, the size of each of the FD shared blocks 301 is constant regardless of an arrangement location.

Figure 23:
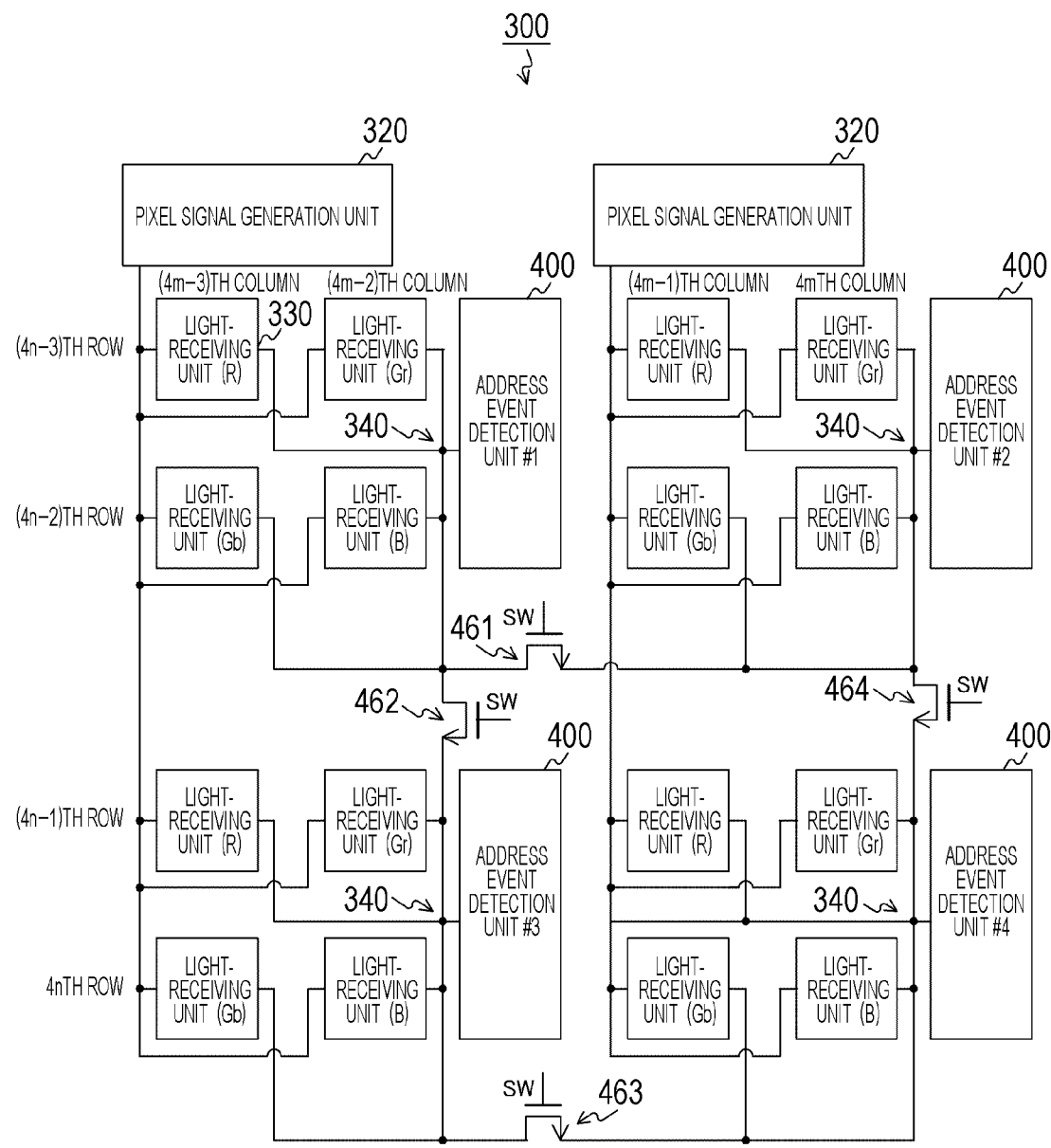
FIG. 23 is a block diagram illustrating a configuration example of a pixel array unit according to the third embodiment of the present technology.

FIG. 23 is a block diagram illustrating a configuration example of the pixel array unit 300 according to the third embodiment of the present technology. Switches 461 to 464 are further arranged in the pixel array unit 300 of the third embodiment. As these switches, for example, an N-type MOS transistor is used.

Focusing on the light-receiving units 330 of sixteen pixels in four rows×four columns, there are two pixel signal generation units 320 and four address event detection units 400 corresponding to the light-receiving units 330. The four address event detection units 400 are referred to as address event detection units #1, #2, #3, and #4, respectively.

The left-side light-receiving units 330 in four rows×two columns are connected to the left-side pixel signal generation unit 320. The right-side light-receiving units 330 in four rows×two columns are connected to the right-side pixel signal generation unit 320. That is, right-side and left-side FD shared blocks 301 are in four rows×two columns.

Furthermore, the light-receiving units 330 in the upper left two rows×two columns are connected to the address event detection unit #1. The light-receiving units 330 in the upper right two rows×two columns are connected to the address event detection unit #2. The light-receiving units 330 in the lower left two rows×two columns are connected to the address event detection unit #3. The light-receiving units 330 in the lower right two rows×two columns are connected to the address event detection unit #4.

Furthermore, the switch 461 opens or closes a path between a connection node 340 of the address event detection unit #1 and a connection node 340 of the address event detection unit #2 according to a control signal SW from the drive circuit 211. The switch 462 opens or closes a path between the connection node 340 of the address event detection unit #1 and a connection node 340 of the address event detection unit #3 according to the control signal SW. The switch 463 opens or closes a path between the connection node 340 of the address event detection unit #3 and a connection node 340 of the address event detection unit #4 according to the control signal SW. The switch 464 opens or closes a path between the connection node 340 of the address event detection unit #2 and the connection node 340 of the address event detection unit #4 according to the control signal SW.

In a case where the drive circuit 211 opens all of the switches 461 to 464 by the control signal SW, the size of the detection blocks 302 becomes two rows×two columns. On the other hand, in a case where the drive circuit 211 closes all of the switches 461 to 464 by the control signal SW, the size of the detection blocks 302 becomes the four rows×four columns. The detection blocks 302 in the two rows×two columns are arranged near the center of the pixel array unit 300, and the detection blocks 302 in the four rows×four columns are arranged near the periphery. Note that the size of the detection blocks 302 can be changed to two rows×four columns or the like by closing only two of the switches 461 to 464. Furthermore, the sizes of the FD shared blocks 301 and the detection blocks 302 and the number of switches are not limited to the above-described configuration.

Note that the light-receiving units 330 in the upper left two rows×two columns are an example of first light-receiving units described in the claims, and the light-receiving units 330 in the upper right two rows×two columns are an example of second light-receiving units described in the claims. Furthermore, the address event detection unit #1 is an example of a first detection unit described in the claims, and the address event detection unit #2 is an example of a second detection unit described in the claims.

Figure 24:
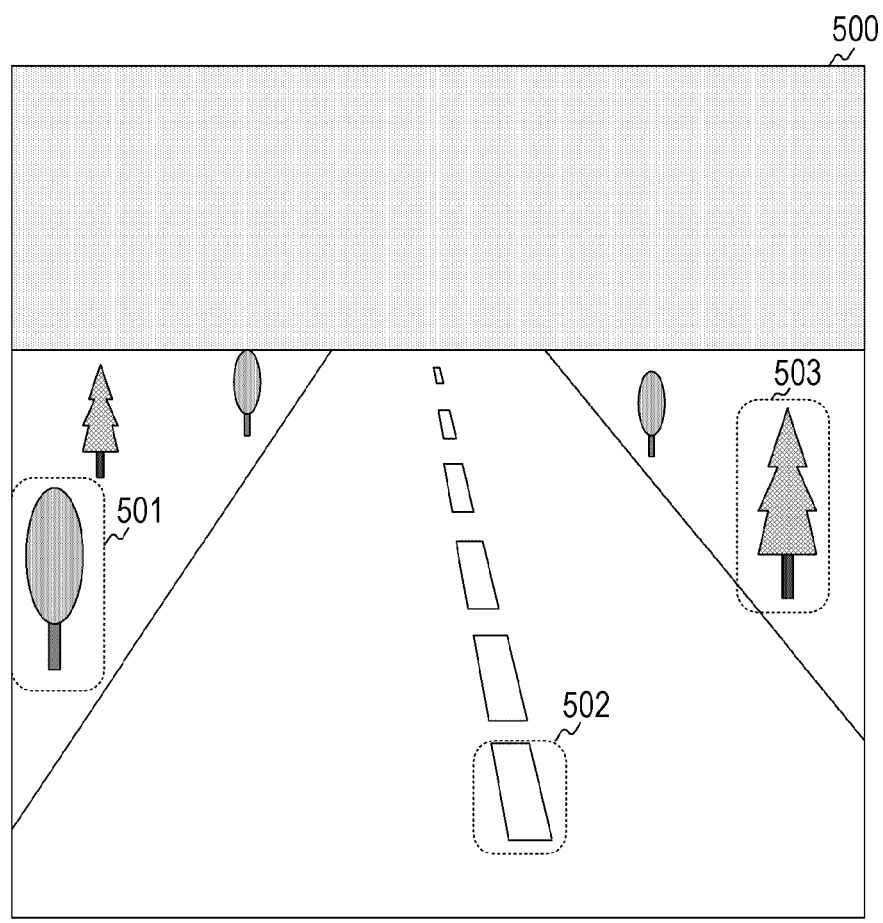
FIG. 24 is a diagram illustrating an example of image data according to the third embodiment of the present technology.

FIG. 24 is a diagram illustrating an example of image data 500 according to the third embodiment of the present technology. The image data 500 is captured by an in-vehicle camera or the like. Objects 501 to 503 such as trees and white lines are captured in the vicinity of a periphery of the image data 500. The sizes of these objects are larger than the sizes of objects near the center. Therefore, even if the unit of detection (detection block 302) near the periphery is increased, the accuracy of image recognition and the like is unlikely to decrease. Meanwhile, by increasing the size of the detection block 302, the detection frequency is reduced and the processing amount of a signal processing unit 212 and the like is reduced, so that the power consumption can be reduced.

As described above, according to the third embodiment of the present technology, since the drive circuit 211 changes the size of the detection block 302, the size of the detection block 302 in the peripheral portion can be made larger than that in the central portion. Thereby, the detection frequency can be reduced, the processing amount of the signal processing unit 212 and the like can be reduced, and the power consumption can be reduced.

[Imaging Device According to Fourth Embodiment (Scan Method)]

The above-described imaging device 20 according to the first embodiment is an asynchronous imaging device that reads events by an asynchronous readout method. However, the event readout method is not limited to the asynchronous readout method and may be the synchronous readout method. An imaging device to which the synchronous readout method is applied is a scan-type imaging device, which is the same as a normal imaging device that performs imaging at a predetermined frame rate.

Figure 25:
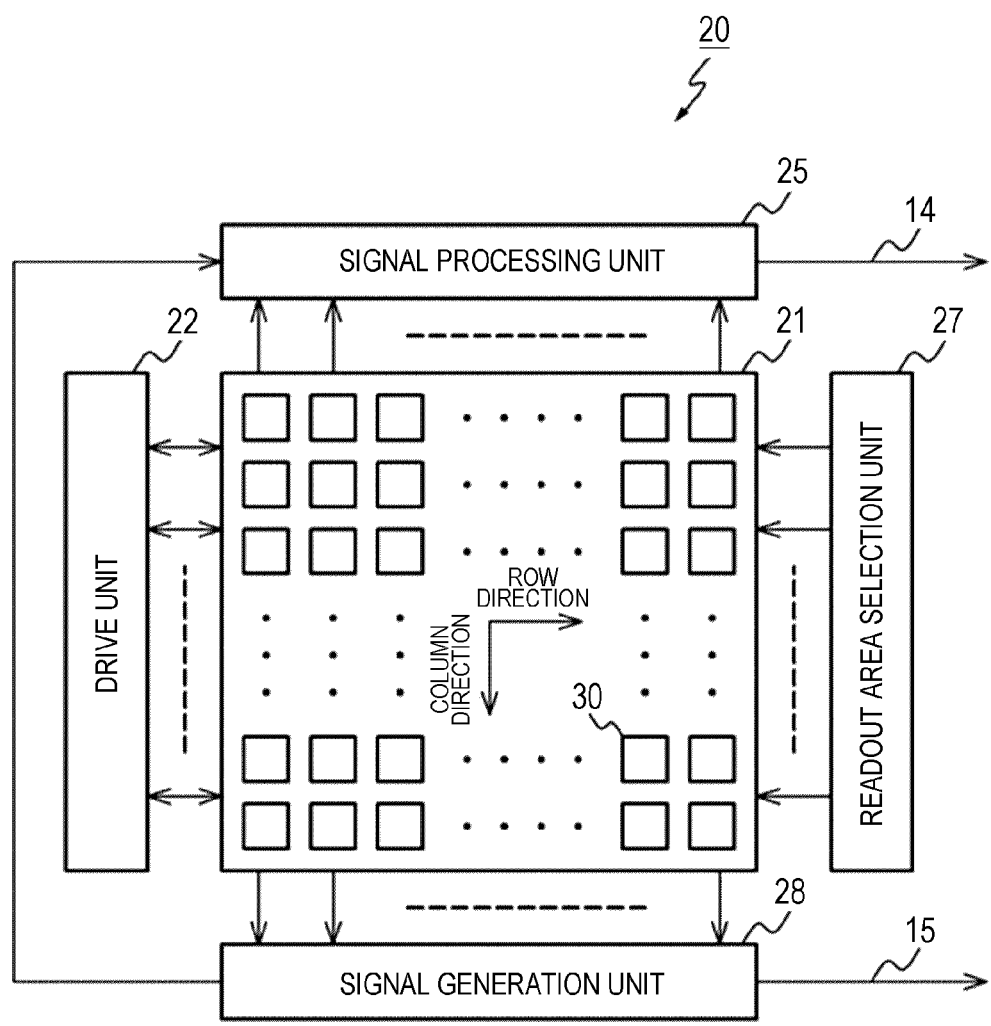
FIG. 25 is a block diagram illustrating a configuration example of an imaging device according to a fourth embodiment of the present technology.

FIG. 25 is a block diagram illustrating an example of a configuration of an imaging device according to a fourth embodiment, that is, a scan-type imaging device, which is used as an imaging device 20 in an imaging system 10 to which the technology according to the present disclosure is applied.

As illustrated in FIG. 25, the imaging device 20 according to the fourth embodiment as the imaging device of the present disclosure includes a pixel array unit 21, a drive unit 22, a signal processing unit 25, a readout area selection unit 27, and a signal generation unit 28.

The pixel array unit 21 includes a plurality of pixels 30. The plurality of pixels 30 outputs output signals in response to a selection signal from the readout area selection unit 27. The configuration of each of the plurality of pixels 30 is similar to that of the pixel 310 illustrated in FIG. 4. The plurality of pixels 30 outputs output signals corresponding to the change amount of light intensity. The plurality of pixels 30 may be two-dimensionally arranged in a matrix as illustrated in FIG. 25.

The drive unit 22 drives each of the plurality of pixels 30 and causes the signal processing unit 25 to output the pixel signal generated in each pixel 30. Note that the drive unit 22 and the signal processing unit 25 are circuit units for acquiring gradation information. Therefore, in a case of acquiring only event information, the drive unit 22 and the signal processing unit 25 may be omitted.

The readout area selection unit 27 selects part of the plurality of pixels 30 included in the pixel array unit 21. Specifically, the readout area selection unit 27 determines a selected area in response to a request from each pixel 30 of the pixel array unit 21. For example, the readout area selection unit 27 selects any one or a plurality of rows from among rows included in a structure of a two-dimensional matrix corresponding to the pixel array unit 21. The readout area selection unit 27 sequentially selects one or a plurality of rows according to a preset cycle. Furthermore, the readout area selection unit 27 may determine the selected area in response to a request from each pixel 30 of the pixel array unit 21.

The signal generation unit 28 generates an event signal corresponding to an active pixel that has detected an event among the selected pixels on the basis of the output signals of the pixels selected by the readout area selection unit 27. The event is an event in which the intensity of light changes. The active pixel is a pixel in which the change amount of the intensity of light corresponding to the output signal exceeds or falls below a preset threshold. For example, the signal generation unit 28 compares the output signal of the pixel with a reference signal, detects the active pixel that outputs the output signal in a case where the output signal is larger or smaller than the reference signal, and generates the event signal corresponding to the active pixel.

The signal generation unit 28 can include, for example, a column selection circuit that arbitrates signals entering the signal generation unit 28. Furthermore, the signal generation unit 28 may be configured to output not only the information of the active pixel in which an event is detected but also information of inactive pixels in which an event is not detected.

The signal generation unit 28 outputs address information and time stamp information (for example, (X, Y, T)) of the active pixel in which the event is detected through an output line 15. Note that data output from the signal generation unit 28 may be not only the address information and the time stamp information but also frame format information (for example, (0, 0, 1, 0, . . . )).

5. Applications to Moving Bodies

The technology according to the present disclosure (present technology) can be applied to various products. For example, the technology according to the present disclosure may be realized as a device mounted on any type of moving bodies including an automobile, an electric automobile, a hybrid electric automobile, a motorcycle, a bicycle, a personal mobility, an airplane, a drone, a ship, a robot, and the like.

Figure 26:
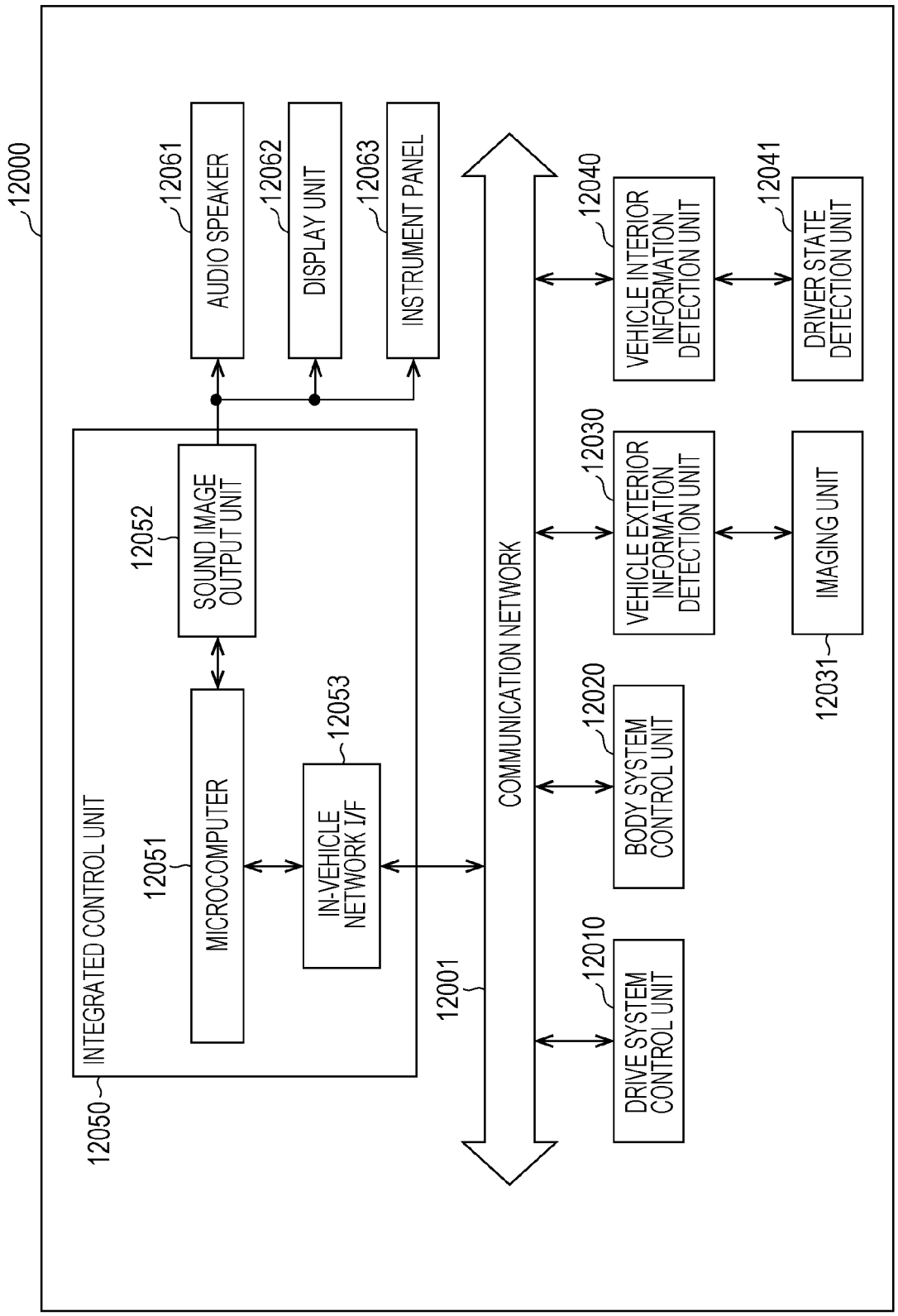
FIG. 26 is a block diagram illustrating a schematic configuration example of a vehicle control system.

FIG. 26 is a block diagram illustrating a schematic configuration example of a vehicle control system as an example of a moving body control system to which the technology according to the present disclosure is applicable.

A vehicle control system 12000 includes a plurality of electronic control units connected through a communication network 12001. In the example illustrated in FIG. 26, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle, and the like.

The body system control unit 12020 controls operations of various devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform object detection processing or distance detection processing of persons, vehicles, obstacles, signs, letters on a road surface, or the like on the basis of the received image.

The imaging unit 12031 is an optical sensor that receives light and outputs an electrical signal according to a light-receiving amount of the light. The imaging unit 12031 can output the electrical signal as an image and can output the electrical signal as information of distance measurement. Furthermore, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether or not the driver falls asleep on the basis of the detection information input from the driver state detection unit 12041.

The microcomputer 12051 calculates a control target value of the drive force generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on an inter-vehicle distance, vehicle speed maintaining travel, collision warning of the vehicle, lane out warning of the vehicle, and the like.

Furthermore, the microcomputer 12051 controls the drive force generation device, the steering mechanism, the braking device, or the like on the basis of the information of a vicinity of the vehicle acquired in the vehicle exterior information detection unit 12030 or the vehicle interior information detection unit 12040 to perform cooperative control for the purpose of automatic drive of autonomous travel without depending on an operation of the driver or the like.

Furthermore, the microcomputer 12051 can output a control command to the body system control unit 12020 on the basis of the information outside the vehicle acquired in the vehicle exterior information detection unit 12030. For example, the microcomputer 12051 can perform cooperative control for the purpose of achievement of non-glare such as by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound or an image to an output device that can visually and aurally notify a passenger of the vehicle or an outside of the vehicle of information. In the example in FIG. 26, as the output device, an audio speaker 12061, a display unit 12062, and an instrument panel 12063 are exemplarily illustrated. The display unit 12062 may include, for example, at least one of an on-board display or a head-up display.

Figure 27:
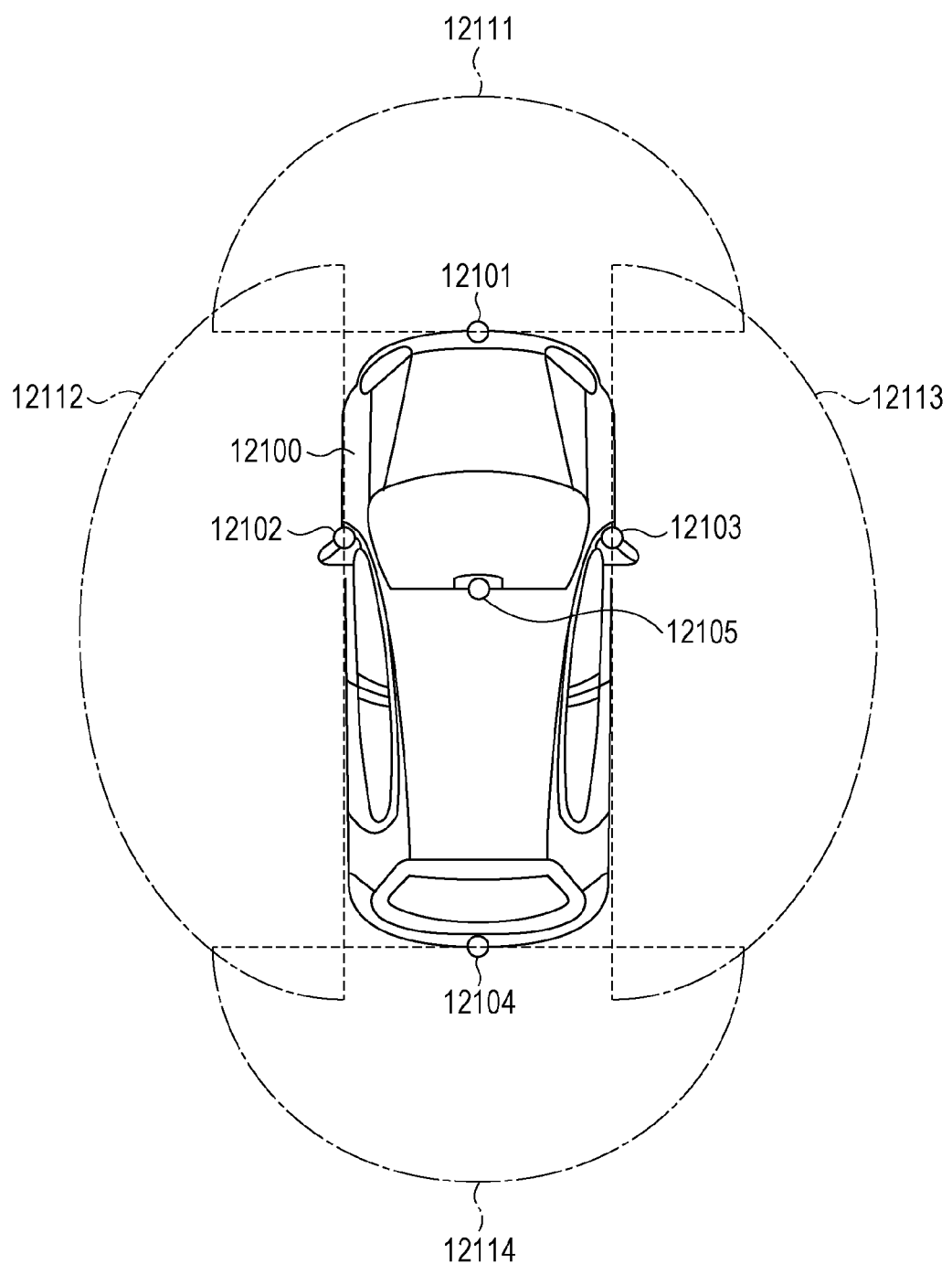
FIG. 27 is an explanatory diagram illustrating an example of installation positions of imaging units.

FIG. 27 is a diagram illustrating an example of an installation position of the imaging unit 12031.

In FIG. 27, imaging units 12101, 12102, 12103, 12104, and 12105 are included as the imaging unit 12031.

The imaging units 12101, 12102, 12103, 12104, and 12105 are provided at positions of a front nose, side mirrors, a rear bumper, a back door, an upper portion of a windshield, and the like in an interior of a vehicle 12100, for example. The imaging unit 12101 provided at the front nose and the imaging unit 12105 provided at an upper portion of the windshield in an interior of the vehicle mainly acquire images in front of the vehicle 12100. The imaging units 12102 and 12103 provided at the side mirrors mainly acquire images on sides of the vehicle 12100. The imaging unit 12104 provided at the rear bumper or the back door mainly acquires images in back of the vehicle 12100. The imaging unit 12105 provided at the upper portion of the windshield in the interior of the vehicle is mainly used for detecting a leading vehicle, a pedestrian, an obstacle, a traffic signal, a traffic sign, a lane, or the like.

Note that FIG. 27 illustrates an example of imaging ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function to acquire distance information. For example, at least one of the imaging units 12101 to 12104 may be a stereo camera including a plurality of imaging elements or may be an imaging element having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract particularly a three-dimensional object closest to the vehicle 12100 on a traveling road and traveling at a predetermined speed (for example, 0 km/h or more) in substantially the same direction as the vehicle 12100 as a leading vehicle. Moreover, the microcomputer 12051 can set an inter-vehicle distance to be secured from the leading vehicle in advance and perform automatic braking control (including following stop control) and automatic acceleration control (including following start control), and the like. In this way, the cooperative control for the purpose of automatic drive of autonomous travel without depending on an operation of the driver, and the like can be performed.

For example, the microcomputer 12051 classifies three-dimensional object data regarding three-dimensional objects into two-wheeled vehicles, ordinary cars, large vehicles, pedestrians, and other three-dimensional objects such as electric poles to be extracted, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. The microcomputer 12051 then determines a collision risk indicating a risk of collision with each of the obstacles, and can perform drive assist for collision avoidance by outputting warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether or not a pedestrian exists in the captured images of the imaging units 12101 to 12104, thereby to recognize the pedestrian. Such recognition of a pedestrian is performed by a process of extracting characteristic points in the captured images of the imaging units 12101 to 12104, as the infrared camera, for example, and by a process of performing pattern matching processing for the series of characteristic points indicating a contour of an object and determining whether or not the object is a pedestrian. When the microcomputer 12051 determines that a pedestrian exists in the captured images of the imaging units 12101 to 12104 and recognizes the pedestrian, the sound image output unit 12052 causes the display unit 12062 to superimpose and display a square contour line for emphasis on the recognized pedestrian. Furthermore, the sound image output unit 12052 may cause the display unit 12062 to display an icon or the like representing the pedestrian at a desired position.

An example of a vehicle control system to which the technology according to the present disclosure is applicable has been described. The technology according to the present disclosure is applicable to the imaging unit 12031, of the above-described configurations, for example. Specifically, the imaging device 100 in FIG. 1 can be applied to the imaging unit 12031. By applying the technology according to the present disclosure to the imaging unit 12031, the readout speed of the image data can be improved.

Note that the above-described embodiments describe an example for embodying the present technology, and the matters in the embodiments and the matters used to specify the invention in the claims have corresponding relationships with each other. Similarly, the matters used to specify the invention in the claims and the matters in the embodiment of the present technology given the same names have corresponding relationships with each other. However, the present technology is not limited to the embodiments, and can be embodied by application of various modifications to the embodiments without departing from the gist of the present technology.

Furthermore, the processing procedures described in the above embodiments may be regarded as a method having these series of procedures, and also regarded as a program for causing a computer to execute these series of procedures and as a recording medium for storing the program. As this recording medium, for example, a compact disc (CD), a MiniDisc (MD), a digital versatile disc (DVD), a memory card, a Blu-ray (registered trademark) disc, or the like can be used.

Note that the effects described in the present specification are merely examples and are not limited, and other effects may be exhibited.

Note that the present technology can also have the following configurations.

(1) A solid-state imaging element including:

a detection block in which a first pixel that generates a first analog signal by photoelectric conversion and a second pixel that generates a second analog signal by photoelectric conversion are arrayed;

a first analog-digital converter configured to convert the first analog signal into a digital signal on the basis of whether or not a change amount of an incident light amount of the detection block exceeds a predetermined threshold; and a second analog-digital converter configured to convert the second analog signal into a digital signal on the basis of whether or not the change amount exceeds the threshold.

(2) The solid-state imaging element according to (1), further including:

a first shared block in which a predetermined number of the first pixels is arrayed, the first pixels sharing a floating diffusion layer that accumulates a charge of an amount according to the first analog signal; and a second shared block in which a predetermined number of the second pixels is arrayed, the second pixels sharing a floating diffusion layer that accumulates a charge of an amount according to the second analog signal, in which at least a part of the first shared block and at least a part of the second shared block are arranged in the detection block.

(3) The solid-state imaging element according to (2), in which the detection block includes first and second detection blocks, a part of the first shared block and a part of the second shared block are arranged in the first detection block, and a rest of the first shared block and a rest of the second shared block are arranged in the second detection block.

(4) The solid-state imaging element according to (2), in which a part of the first shared block and a part of the second shared block are arranged in the detection block, and a rest of the first shared block and a rest of the second shared block are not arranged in the detection block.

(5) The solid-state imaging element according to any one of (1) to (4), further including:

a drive circuit configured to change a size of the detection block by a predetermined control signal.

(6) The solid-state imaging element according to (5), in which the detection block includes a plurality of first light-receiving units each configured to generate a charge by photoelectric conversion, a plurality of second light-receiving units each configured to generate a charge by photoelectric conversion, a first detection unit configured to detect whether or not a change amount of a photocurrent flowing through a first connection node to which the plurality of first light-receiving units is connected exceeds the threshold, a second detection unit configured to detect whether or not a change amount of a photocurrent flowing through a second connection node to which the plurality of second light-receiving units is connected exceeds the threshold, and a switch configured to open or close a path between the first connection node and the second connection node according to the control signal.

(7) The solid-state imaging element according to any one of (1) to (6), in which the detection block includes a plurality of light-receiving units each configured to generate a charge by photoelectric conversion, and a detection unit configured to detect whether or not a change amount of a photocurrent according to an amount of the charge exceeds the threshold, the plurality of light-receiving units is arranged in pixels different from one another, and the plurality of light-receiving units shares the detection unit.

(8) An imaging device including:

a detection block in which a first pixel that generates a first analog signal by photoelectric conversion and a second pixel that generates a second analog signal by photoelectric conversion are arrayed;

a first analog-digital converter configured to convert the first analog signal into a digital signal on the basis of whether or not a change amount of an incident light amount of the detection block exceeds a predetermined threshold;

a second analog-digital converter configured to convert the second analog signal into a digital signal on the basis of whether or not the change amount exceeds the threshold; and a signal processing unit configured to process the digital signals.

REFERENCE SIGNS LIST

100 Imaging device
110 Imaging lens
120 Recording unit
130 Control unit
200 Solid-state imaging element
201 Light-receiving chip
202 Detection chip
211 Drive circuit
212 Signal processing unit
213 Arbiter
220 Column ADC
221, 222 ADC
300 Pixel array unit
301 FD shared block
302 Detection block
310 Pixel
320 Pixel signal generation unit
321 Reset transistor
322 Amplification transistor
323 Selection transistor
324 Floating diffusion layer
330, 335 Light-receiving unit
331, 336 Transfer transistor
332 OFG transistor
333, 337 Photoelectric conversion element
400 Address event detection unit
410 Current-voltage conversion unit
411, 413 N-type transistor
412 P-type transistor
420 Buffer
430 Subtractor
431, 433 Capacitor
432 Inverter
434, 461 to 464 Switch
440 Quantizer
441 Comparator
450 Transfer unit
12031 Imaging unit

The invention claimed is:

1. A solid-state imaging element comprising:
a detection block in which a first pixel that generates a first analog signal by photoelectric conversion and a second pixel that generates a second analog signal by photoelectric conversion are arrayed;
a first analog-digital converter configured to convert the first analog signal into a digital signal on a basis of whether or not a change amount of an incident light amount of the detection block exceeds a threshold;
a second analog-digital converter configured to convert the second analog signal into a digital signal on a basis of whether or not the change amount exceeds the threshold; and
a drive circuit configured to change a size of the detection block by a predetermined control signal, wherein
the detection block includes
a plurality of first light-receiving units each configured to generate a charge by photoelectric conversion,
a plurality of second light-receiving units each configured to generate a charge by photoelectric conversion,
a first detection circuitry configured to detect whether or not a change amount of a photocurrent flowing through a first connection node to which the plurality of first light-receiving units is connected exceeds the threshold, a second detection circuitry configured to detect whether or not a change amount of a photocurrent flowing through a second connection node to which the plurality of second light-receiving units is connected exceeds the threshold, and a switch configured to open or close a path between the first connection node and the second connection node according to the control signal.

2. The solid-state imaging element according to claim 1, further comprising:

a first shared block in which a predetermined number of the first pixels is arrayed, the first pixels sharing a floating diffusion layer that accumulates a charge of an amount according to the first analog signal; and a second shared block in which a predetermined number of the second pixels is arrayed, the second pixels sharing a floating diffusion layer that accumulates a charge of an amount according to the second analog signal, wherein at least a part of the first shared block and at least a part of the second shared block are arranged in the detection block.

3. The solid-state imaging element according to claim 2, wherein the detection block includes first and second detection blocks, a part of the first shared block and a part of the second shared block are arranged in the first detection block, and a rest of the first shared block and a rest of the second shared block are arranged in the second detection block.

4. The solid-state imaging element according to claim 2, wherein a part of the first shared block and a part of the second shared block are arranged in the detection block, and a rest of the first shared block and a rest of the second shared block are not arranged in the detection block.

5. An imaging device comprising:

a detection block in which a first pixel that generates a first analog signal by photoelectric conversion and a second pixel that generates a second analog signal by photoelectric conversion are arrayed;

a first analog-digital converter configured to convert the first analog signal into a digital signal on a basis of whether or not a change amount of an incident light amount of the detection block exceeds a threshold;

a second analog-digital converter configured to convert the second analog signal into a digital signal on a basis of whether or not the change amount exceeds the threshold;

a signal processor configured to process the digital signals; and a drive circuit configured to change a size of the detection block by a predetermined control signal, wherein the detection block includes a plurality of first light-receiving units each configured to generate a charge by photoelectric conversion, a plurality of second light-receiving units each configured to generate a charge by photoelectric conversion, a first detection circuitry configured to detect whether or not a change amount of a photocurrent flowing through a first connection node to which the plurality of first light-receiving units is connected exceeds the threshold, a second detection circuitry configured to detect whether or not a change amount of a photocurrent flowing through a second connection node to which the plurality of second light-receiving units is connected exceeds the threshold, and a switch configured to open or close a path between the first connection node and the second connection node according to the control signal.

6. The imaging device according to claim 5, further comprising:

a first shared block in which a predetermined number of the first pixels is arrayed, the first pixels sharing a floating diffusion layer that accumulates a charge of an amount according to the first analog signal; and a second shared block in which a predetermined number of the second pixels is arrayed, the second pixels sharing a floating diffusion layer that accumulates a charge of an amount according to the second analog signal, wherein at least a part of the first shared block and at least a part of the second shared block are arranged in the detection block.

7. The imaging device according to claim 6, wherein the detection block includes first and second detection blocks, a part of the first shared block and a part of the second shared block are arranged in the first detection block, and a rest of the first shared block and a rest of the second shared block are arranged in the second detection block.

8. The imaging device according to claim 6, wherein a part of the first shared block and a part of the second shared block are arranged in the detection block, and a rest of the first shared block and a rest of the second shared block are not arranged in the detection block.

* * * * *